(12) United States Patent
Lee et al.

(10) Patent No.: US 10,244,526 B2
(45) Date of Patent: Mar. 26, 2019

(54) METHOD AND APPARATUS FOR TRANSMITTING AND RECEIVING USING SHORT TTI

(71) Applicant: ELECTRONICS AND TELECOMMUNICATIONS RESEARCH INSTITUTE, Daejeon (KR)

(72) Inventors: Anseok Lee, Daejeon (KR); Taegyun Noh, Daejeon (KR); Sung Cheol Chang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 74 days.

(21) Appl. No.: 15/349,524

(22) Filed: Nov. 11, 2016

(65) Prior Publication Data

US 2017/0142712 A1 May 18, 2017

(30) Foreign Application Priority Data

Nov. 12, 2015 (KR) .................... 10-2015-0159228
Nov. 7, 2016 (KR) .................... 10-2016-0147707

(51) Int. Cl.
*H04W 4/00* (2018.01)
*H04W 72/04* (2009.01)
*H04L 5/00* (2006.01)

(52) U.S. Cl.
CPC ....... *H04W 72/0446* (2013.01); *H04L 5/0053* (2013.01); *H04W 72/042* (2013.01); *H04W 72/0413* (2013.01); *H04W 72/0453* (2013.01)

(58) Field of Classification Search
CPC ......... H04W 72/0446; H04W 72/0413; H04W 72/042; H04W 72/0453
See application file for complete search history.

(56) References Cited

U.S. PATENT DOCUMENTS

| 9,113,465 B2 | 8/2015 | Lee et al. |
| 2010/0246513 A1* | 9/2010 | Lindskog .............. H04L 1/1825 370/329 |
| 2013/0039291 A1 | 2/2013 | Blankenship et al. |
| 2014/0071954 A1 | 3/2014 | Au et al. |
| 2014/0293957 A1 | 10/2014 | Chun et al. |
| 2014/0301238 A1 | 10/2014 | Chun et al. |
| 2016/0044645 A1 | 2/2016 | Noh et al. |

(Continued)

FOREIGN PATENT DOCUMENTS

KR          10-1605279 B1     3/2016

OTHER PUBLICATIONS

R1-157110, 3GPP TSG RAN WG1 Meeting #83, Anaheim, USA, Nov. 16-20, 2015.

(Continued)

*Primary Examiner* — Abdelnabi O Musa
(74) *Attorney, Agent, or Firm* — Rabin & Berdo, P.C.

(57) ABSTRACT

Disclosed are a method and an apparatus for receiving data by decoding a control channel received in unit of a short transmission time interval (sTTI); and receiving, if a first control channel matched with the terminal is determined based on the decoding result, data in a short resource block set (sRBS) including the first control channel.

20 Claims, 29 Drawing Sheets

(56) References Cited

U.S. PATENT DOCUMENTS

| | | | | |
|---|---|---|---|---|
| 2016/0128056 A1* | 5/2016 | Jiang | .................. | H04L 27/2602 |
| | | | | 370/329 |
| 2016/0173247 A1* | 6/2016 | Patel | .................... | H04L 5/0044 |
| | | | | 370/329 |
| 2017/0135127 A1* | 5/2017 | Nogami | ............ | H04W 72/1289 |
| 2017/0290008 A1* | 10/2017 | Tooher | ............. | H04W 72/0446 |
| 2018/0206266 A1* | 7/2018 | Byun | ........................ | H04L 5/00 |

OTHER PUBLICATIONS

R1-161011, 3GPP TSG RAN WG1 Meeting #84, Malta, Feb. 15-19, 2016.

R1-161012, 3GPP TSG RAN WG1 Meeting #84, Malta, Feb. 15-19, 2016.

\* cited by examiner

METHOD AND APPARATUS FOR TRANSMITTING AND RECEIVING USING SHORT TTI

CROSS-REFERENCE TO RELATED APPLICATION

This application claims priority to and the benefit of Korean Patent Application Nos. 10-2015-0159228 and 10-2016-0147707 filed in the Korean Intellectual Property Office on Nov. 12, 2015 and Nov. 7, 2016, the entire contents of which are incorporated herein by reference.

BACKGROUND OF THE INVENTION (a) Field of the Invention

The present invention relates to a method and an apparatus for transmitting and receiving data using TTI in a slot unit or a subslot unit.

(b) Description of the Related Art

According to a frequency division duplex (FDD) frame configuration of a long term evolution (LTE) system, each carrier performs a downlink/uplink (DL/UL) transmission at a transmission time interval (TTI) in a subframe (1 [ms]) unit. Further, a channel for resource allocation in a subframe unit and downlink control channels (e.g., physical downlink control channel (PDCCH), physical HARQ indicator channel (PHICH), physical uplink control channel (PUCCH)) in a subframe unit for hybrid automatic repeat reQuest (HARQ) feedback are present and data channels (for example, physical downlink shared channel (PDSCH), physical uplink shared channel (PUSCH)) in a subframe unit for data transmission are present. That is, the LTE system supports only the TTI in a 1 [ms] unit and does not support the transmission in a time unit shorter than that.

SUMMARY OF THE INVENTION

The present invention has been made in an effort to provide a method and an apparatus for transmitting/receiving a control channel and a data channel at a short transmission time interval.

An exemplary embodiment of the present invention provides a terminal for receiving data. The terminal includes: a processor, a memory, and a radio frequency unit, in which the processor executes a program stored in the memory to perform: decoding a control channel received in a short transmission time interval (sTTI) unit; and receiving data in a data region of a short resource block set (sRBS) including a first control channel if the first control channel matching the terminal is determined on the basis of the decoding result.

The sRBS may include at least one short resource block (sRB), the sRB may include a smaller number of orthogonal frequency division multiplexing (OFDM) symbols than the number of legacy resource blocks, and the sRBS may be included in a short-TTI region included in a region in which a legacy control channel is excluded from a subframe.

The control channel may be configured in unit of a short control channel element (sCCE) including some of a plurality of REs included in the sRBS.

If an aggregation level of the control channel is A, an index of the sRBS corresponding to a start position of the sCCE included in the control channel may be a multiple of A.

Short downlink control information (sDCI) of the control channel may include a resource expansion field and the processor may perform receiving the data by the plurality of sRBSs according to a size of the data channel indicated by the resource expansion field when performing the receiving of the data.

An index of the sRBS including the data region may be equal to a sCCE of the control channel that has the same aggregation level as a size indicated through the resource expansion field and may include a first index of the sCCE of the control channel.

If a length of the resource expansion field is 2 bits and a value of the resource expansion field is 00, 01, 10, and 11, the size of the data channel may be indicated by 1, 2, 4, and 8, respectively.

The processor may further perform acquiring uplink control information in a control channel that is not used to allocate the data channel when performing the receiving of the data.

The sDCI may further include a control resource reuse (CRR) field, and the processor may further perform receiving the data in the control channel that is not used to allocate the data channel on the basis of the control resource reuse field when performing the receiving of the data.

The processor may perform receiving the data in the control channel that is not used to allocate the data channel if a value of the control resource reuse field is 1 and not receiving the data in the control channel that is not used to allocate the data channel if the value of the control resource reuse field is 0, when performing the receiving of the data in the control channel that is not used to allocate the data channel on the basis of the control resource reuse field.

Another exemplary embodiment of the present invention provides a method for receiving, by a terminal, data. The method includes: decoding a control channel received in unit of a short transmission time interval (sTTI); and receiving data in a data region of a short resource block set (sRBS) including a first control channel if the first control channel matching the terminal is determined on the basis of the decoding result.

The sRBS may include at least one short resource block (sRB), the sRB may include a smaller number of orthogonal frequency division multiplexing (OFDM) symbols than the number of legacy resource blocks, and the sRBS may be included in a short-TTI region included in a region in which a legacy control channel is excluded from a subframe.

The control channel may be configured in unit of a short control channel element (sCCE) including some of a plurality of REs included in the sRBS.

If an aggregation level of the control channel is A, an index of the sRBS corresponding to a start position of the sCCE included in the control channel may be a multiple of A.

The index of the sRBS including the data region may start a position retreated by the number of sRBSs from the maximum index of the sCCE of the control channel.

Short downlink control information (sDCI) of the control channel may include a resource expansion field and the receiving of the data may include receiving the data by the plurality of sRBSs according to a size of the data channel indicated by the resource expansion field.

An index of the sRBS including the data region may be equal to a sCCE of the control channel that has the same aggregation level as a size indicated through the resource expansion field and may include a first index of the sCCE of the control channel.

If a length of the resource expansion field is 2 bits and a value of the resource expansion field is 00, 01, 10, and 11, the size of the data channel may be indicated by 1, 2, 4, and 8, respectively.

The receiving of the data may further include acquiring uplink control information in a control channel that is not used to allocate the data channel.

The sDCI may further include a control resource reuse (CRR) field, and the receiving of the data may further include receiving the data in the control channel that is not used to allocate the data channel on the basis of the control resource reuse field.

The receiving of the data in the control channel that is not used to allocate the data channel on the basis of the control resource reuse field may include receiving the data in the control channel that is not used to allocate the data channel if a value of the control resource reuse field is 1 and not receiving the data in the control channel that is not used to allocate the data channel if the value of the control resource reuse field is 0.

Yet another exemplary embodiment of the present invention provides a terminal for receiving data. The terminal includes a processor, a memory, and a radio frequency unit, wherein the processor executes a program stored in the memory to perform decoding a control channel and receiving the data on the basis of an resource allocation position (RAP) field for representing whether the data resource region included in the DCI of the control channel and allocated by the control channel is transmitted in a subframe unit or a slot unit.

DETAILED DESCRIPTION OF THE EMBODIMENTS

Figure 1:
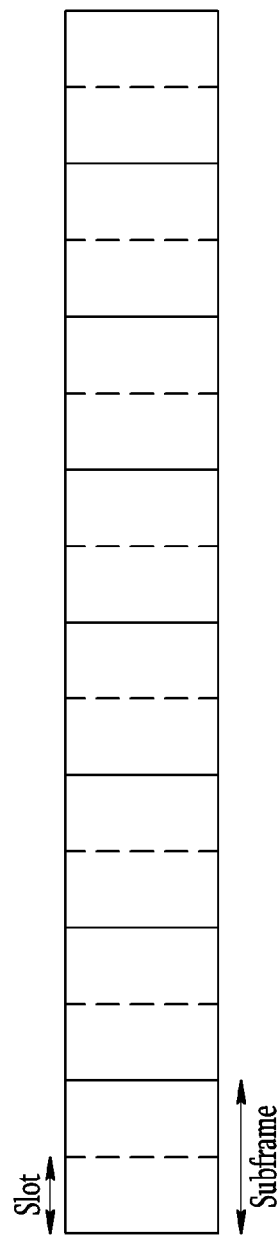
FIG. 1 is a diagram schematically illustrating a frame structure in a subframe unit according to an exemplary embodiment of the present invention.

Hereinafter, exemplary embodiments of the present invention will be described in detail with reference to the accompanying drawings so that those skilled in the art may easily practice the present invention. However, the present invention may be modified in various different ways and is not limited to embodiments described herein. In the accompanying drawings, portions unrelated to the description will be omitted in order to obviously describe the present invention, and similar reference numerals will be used to describe similar portions throughout the present specification.

Throughout the specification, a terminal may be called a mobile station (MS), a mobile terminal (MT), an advanced mobile station (AMS), a high reliability mobile station (HR-MS), a subscriber station (SS), a portable subscriber station (PSS), an access terminal (AT), user equipment (UE), a machine type communication device (MTC device), and the like and may also include all or some of the functions of the MS, the MT, the AMS, the HR-MS, the SS, the PSS, the AT, the UE, the MTC device, and the like.

Further, the base station (BS) may be called an advanced base station (ABS), a high reliability base station (HR-BS), a node B, an evolved node B (eNodeB), an access point (AP), a radio access station (RAS), a base transceiver station (BTS), a mobile multihop relay (MMR)-BS, a relay station (RS) serving as a base station, a relay node (RN) serving as a base station, an advanced relay station (ARS) serving as a base station, a high reliability relay station (HR-RS) serving as a base station, small base stations (a femto base station (femto BS), a home node B (HNB), a home eNodeB (HeNB), a pico base station (pico BS), a macro base station (macro BS), a micro base station (micro BS), and the like), and the like and may also include all or some of the functions of the ABS, the HR-BS, the node B, the eNodeB, the AP, the RAS, the BTS, the MMR-BS, the RS, the RN, the ARS, the HR-RS, the small base stations, and the like.

Figure 2:
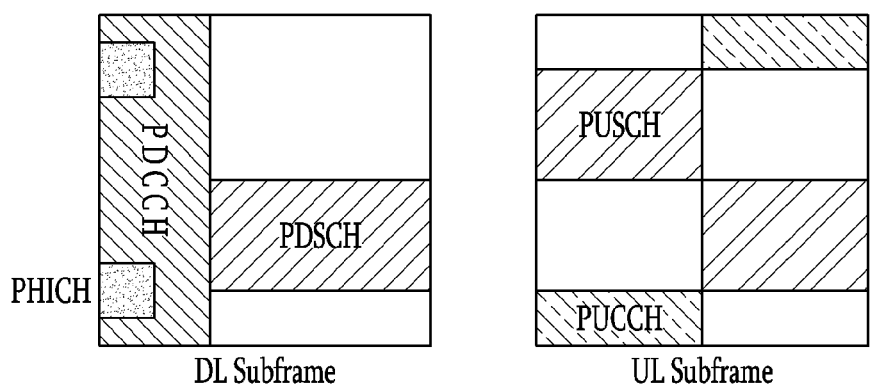
FIG. 2 is a diagram schematically illustrating a control channel and a data channel in a frame structure in a subframe unit according to an exemplary embodiment of the present invention.

FIG. 1 is a diagram schematically illustrating a frame structure in a subframe unit according to an exemplary embodiment of the present invention and FIG. 2 is a diagram schematically illustrating a control channel and a data channel in a frame structure in a subframe unit according to an exemplary embodiment of the present invention.

A terminal of an LTE network may receive or transmit a transmission block (TB) in a subframe unit having a 1 [ms] length.

Referring to FIG. 2, PDCCH is used to schedule a data transmission of downlink and uplink. Further, PDSCH is a region allocated by the PDCCH and a base station may use PDSCH to transmit data to the terminal. PUSCH is a region allocated by the PDCCH and the terminal may use the PUSCH to transmit data to the base station. PHICH is a channel through which the base station transmits, to the terminal, HARQ feedback information representing whether data transmitted from the terminal to the base station are received. PUCCH is an uplink control channel and the terminal transmits, to the base station, the HARQ feedback information representing whether the downlink data are received using the PUCCH FIG. 3 is a diagram schematically illustrating a channel having a slot unit TTI structure using a legacy channel according to an exemplary embodiment of the present invention.

Figure 3:
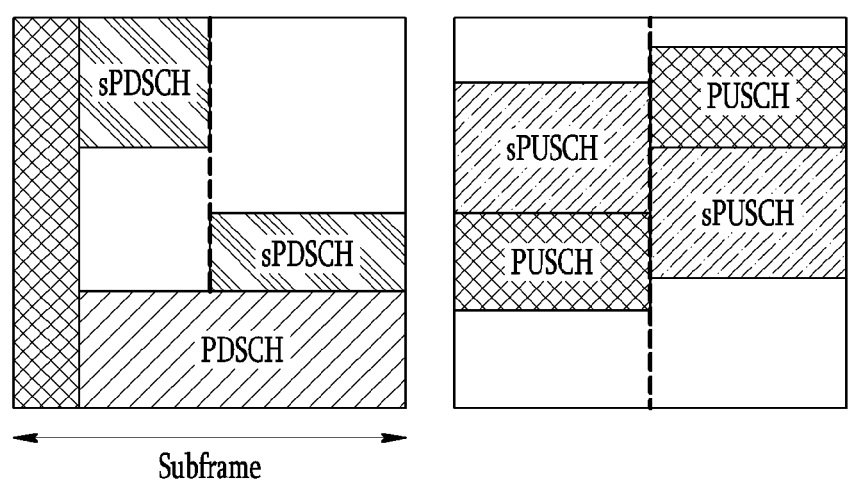
FIG. 3 is a diagram schematically illustrating a channel having a slot unit TTI structure using a legacy channel according to an exemplary embodiment of the present invention.

In FIG. 3, short PDSCH (sPDSCH) is a short downlink data channel and a short PUSCH (sPUSCH) is a short uplink data channel, in which the two data channels may perform data transmission/reception in a slot unit. In resource allocation using a legacy channel, the sPDSCH and sPUSCH resources may be allocated through legacy PDCCH or EPDCCH. Downlink control information (DCI) transmitted through the PDCCH or the EPDCCH according to the exemplary embodiment of the present invention may additionally include a field (2 bits) representing a resource allocation position (RAP) of data resource regions (i.e., PDSCH or sPDSCH) allocated through the PDCCH or the EPDCCH. That is, the base station may use the DCI including the RAP field to perform the scheduling of the TTI transmission/reception in a slot unit. In this case, 2 bit information (i.e., RAP field) representing the resource allocation position is as follows.

00b: Subframe TTI
01b: Slot 0
10b: Slot 1
11 b: Slot 0 and slot 1

Figure 4:
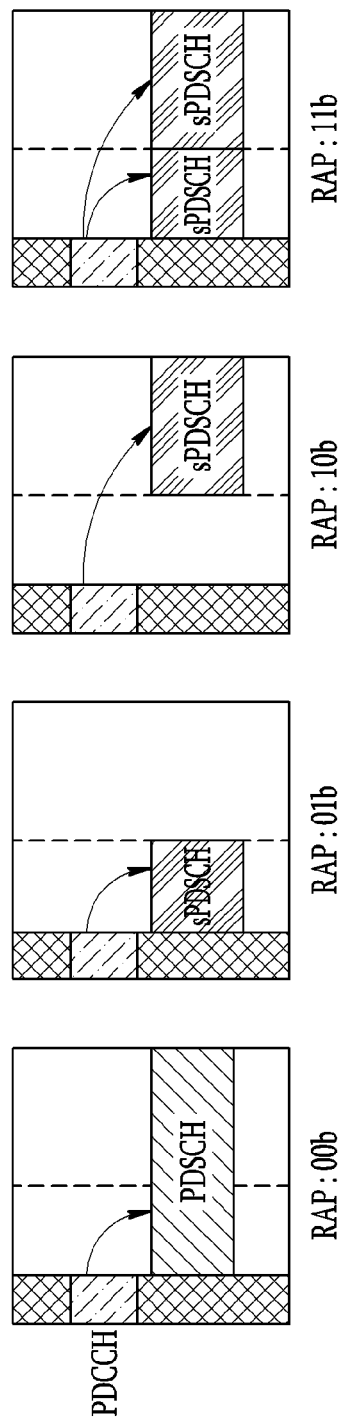
FIG. 4 is a diagram schematically illustrating a method for allocating a downlink data channel having a slot unit TTI structure using a legacy channel according to an exemplary embodiment of the present invention.

FIG. 4 is a diagram schematically illustrating a method for allocating a downlink data channel having a slot unit TTI structure using a legacy channel according to an exemplary embodiment of the present invention.

Referring to FIG. 4, if the RAP field is 00b, the frequency resource allocated through the DCI is scheduled in a subframe unit, like the legacy system. If the RAP field is 01 b or 10b, the frequency resource allocated through the DCI is scheduled in a slot unit and is allocated at positions of slot 0 and slot 1, respectively. If the RAP field is 11b, the frequency resource allocated through the DCI is scheduled in a slot unit and is allocated at positions of slot 0 and slot 1. The RAP field may be set through an upper layer and an operation mode of a specific terminal may support slot-TTI or when the slot-TTI is supported according to capability of the terminal, may be included in the DCI of the legacy control channel.

Figure 5:
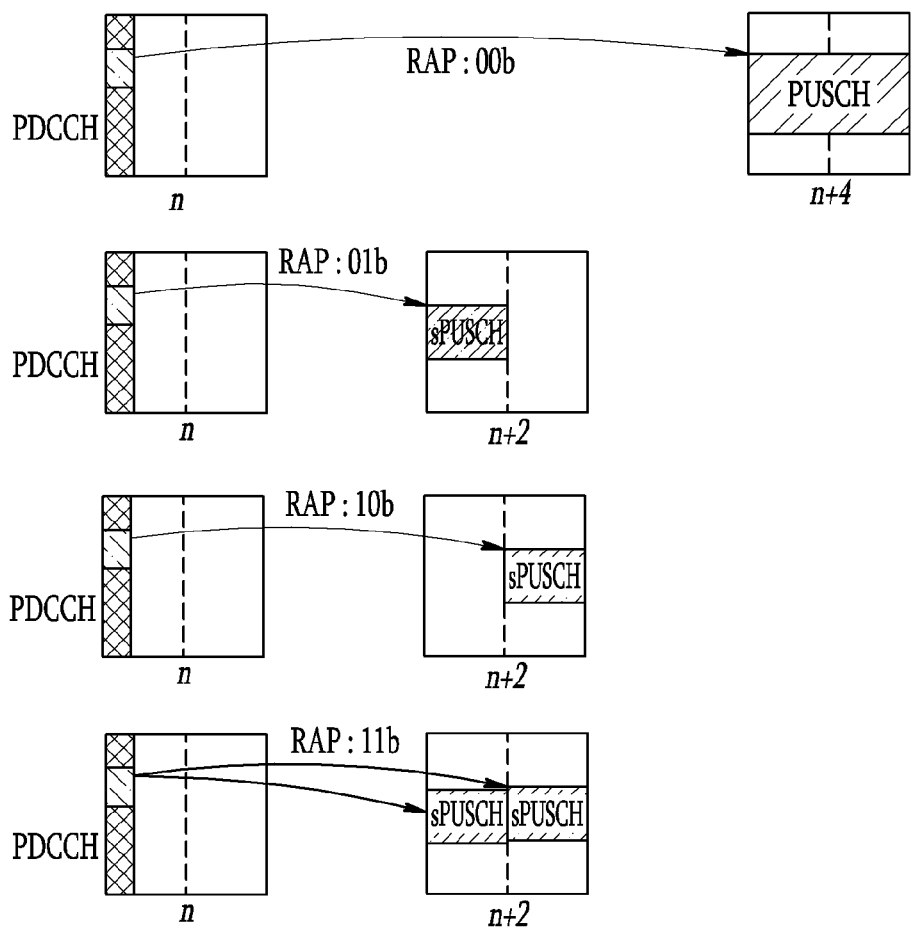
FIG. 5 is a diagram schematically illustrating a method for allocating an uplink data channel having a slot unit TTI structure using a legacy channel according to an exemplary embodiment of the present invention.

FIG. 5 is a diagram schematically illustrating a method for allocating an uplink data channel having a slot unit TTI structure using a legacy channel according to an exemplary embodiment of the present invention.

According to the exemplary embodiment of the present invention, since it takes time for the terminal receiving the DCI to process the uplink data, the uplink resource may be allocated to the terminal as illustrated in FIG. 5. Referring to FIG. 5, if the resource allocation position in the uplink resource allocation is 00b (subframe unit), a resource is allocated in an n+4-th uplink subframe (same as a legacy system). In addition, the data transmission is performed in a slot unit, and therefore the PUSCH is allocated to an n+2-th uplink subframe. At this point, if the RAP field is not 00b, to coexist with the legacy PDSCH even in the resource allocation in a slot unit or acquire frequency diversity of a slot unit transmission, the resource allocation may be performed through a distributed virtual resource block (distributed VRB). In FIG. 5, the processing time of the uplink data considered for the uplink transmission timing is defined as three times of a subframe or slot time unit.

If the RAP field is 10b or 11 b in the uplink resource allocation, hopping may be performed for coexisting with the legacy PUSCH resource. When the frequency hopping is performed, the uplink resource allocated according to a control message (DCI, or the like) for upper layer configuration information or resource allocation moves at a second slot.

In the uplink resource allocation, if the RAP field is 11 b (even and odd slot allocation), a demodulation-reference signal (DM-RS) of the second slot used for channel estimation and demodulation may be omitted.

Figure 6:
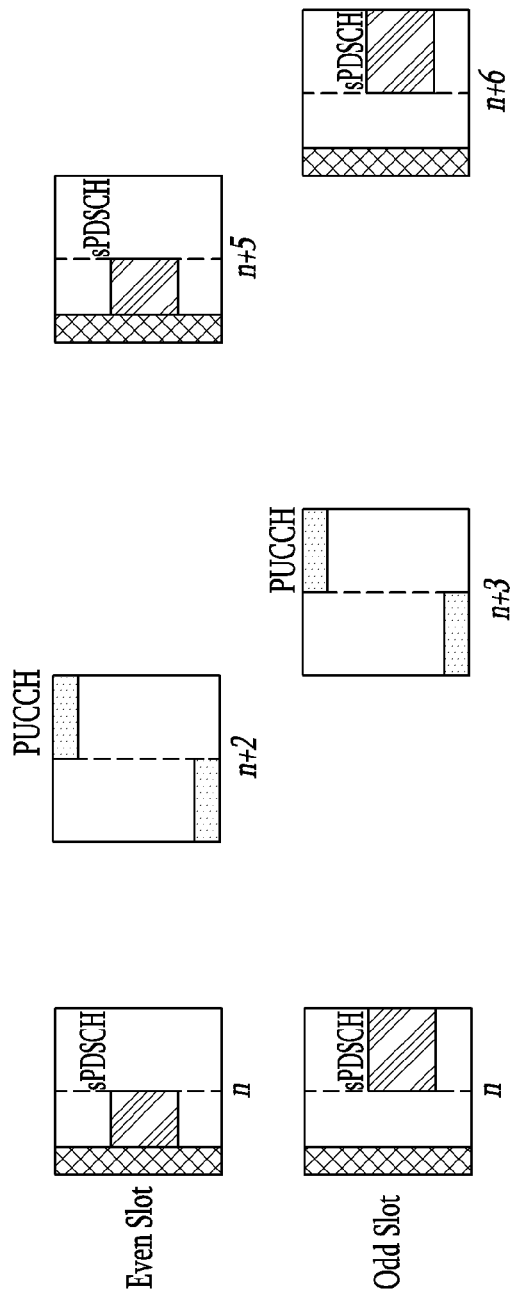
FIG. 6 is a diagram schematically illustrating a HARQ feedback and retransmission procedure for downlink data according to an exemplary embodiment of the present invention.

FIG. 6 is a diagram schematically illustrating a HARQ feedback and retransmission procedure for downlink data according to an exemplary embodiment of the present invention.

In FIG. 6, a minimum time when feedback may be transmitted after the data transmission timing is defined as 3 times of the transmission time (slot). Referring to FIG. 6, the HARQ feedback transmission for the downlink data may be defined as follows. The terminal supporting the slot TTI transmits the HARQ feedback for the sPDSCH, which is received at slot s of subframe n−k, to the base station at subframe n. In this case, k and s for the downlink HARQ feedback are 2 and 0 or 3 and 1 for all n.

The feedback transmitted at subframe n is the sPDSCH transmitted at slot 0 of subframe n−2 and slot 1 of subframe n−3. In addition, the feedback for the PDSCH transmitted at subframe n−4 may also be transmitted at the same subframe. At this point, there is a need to determine the feedback resource to prevent the feedback resources for each data channel from colliding with each other. The HARQ feedback for the PDSCH transmitted at subframe n−4 is transmitted through a PUCCH format 1a/1b. At this point, the transmission resource is as the following Equation 1.

$$n_{PUCCH}^{(1,\tilde{p}1)}=n_{CCE}+N_{PUCCH}^{(1)} \quad \text{(Equation 1)}$$

To prevent the PDSCH transmission and the feedback resource from colliding with each other, when the base station schedules the sPDCSH resources of slot 1 of subframe n−3 or slot 0 of subframe n−2, the sPDSCH resource may be scheduled, avoiding $n_{CCE}$ that has been used at suframe n−4. Therefore, the scheduling restriction occurs, and therefore the following methods may be used to relieve the scheduling restriction.

First, to prevent the PDSCH and the feedback resource from colliding with each other, the feedback resource for the sPDSCH in a slot unit may be determined as the following Equation 2.

$$n_{PUCCH}^{(1,\tilde{p}1)'}=n_{CCE}+N_{PUCCH}^{(1)}+\Delta SRO \quad \text{(Equation 2)}$$

In the above Equation 2, ΔSRO is a value representing a slot resource offset and may be transmitted to the terminal through the upper layer. For example, ΔSRO may be 2. The above Equation 2 is a method for determining a feedback resource for sPDSCH transmission in a form in which the position of the feedback resource for the legacy PDSCH transmission is shared. Alternatively, ΔSRO may be determined as $N_{CCE,k}$. If ΔSRO is determined as $N_{CCE,k}$, the respective feedback resources for the PDSCH transmission and the sPDSCH transmission may be separated from each other.

Alternatively, a field for designating the ΔSRO may be included in a control message for the sPDSCH resource allocation. When the base station performs the resource allocation, if the collision of the feedback resource is expected, the base station may perform the feedback transmission by setting the ΔSRO to be values other than 0.

According to the foregoing methods, the PDSCH transmitted at subframe n−4 and the HARQ feedback for the sPDSCH transmission transmitted at slot 0 of subframe n−2 or slot 1 of subframe n−3 may not collide with each other. However, the feedback may be transmitted at the same resource, for the sPDSCH at slot 0 of subframe n−2 and slot 1 of subframe n−3. To differentiate the feedback for the sPDSCH at slot 0 of subframe n−2 and slot 1 of subframe n−3, the feedback for the sPDSCH of slot 0 of subframe n−2 may be transmitted at the position of the above Equation 2 and the feedback for the sPDSCH of slot 1 of subframe n−3 may be transmitted at the position of the following Equation 3.

$$n_{PUCCH}^{(1,\tilde{p}1,1)}=n_{CCE}+N_{PUCCH}^{(1)}+\Delta SRO+\Delta SRO1 \quad \text{(Equation 3)}$$

In the above Equation 3, ΔSRO1 is a slot resource offset 1 and may be transmitted to the terminal through the upper layer or by the control message for the resource allocation.

According to the exemplary embodiment of the present invention, the retransmission of the downlink data is asynchronous and adaptive. At this point, the retransmission resource is allocated according to the scheduling of the base station. When the time for the reception processing of the feedback information and the transmission processing of the retransmission data is defined as three times of slot, if the base station receives the HARQ feedback at the PUCCH resource of subframe n, the base station may transmit the control information (PDCCH) for retransmission and the retransmission transmission block at minimum subframe n+3.

Figure 7:
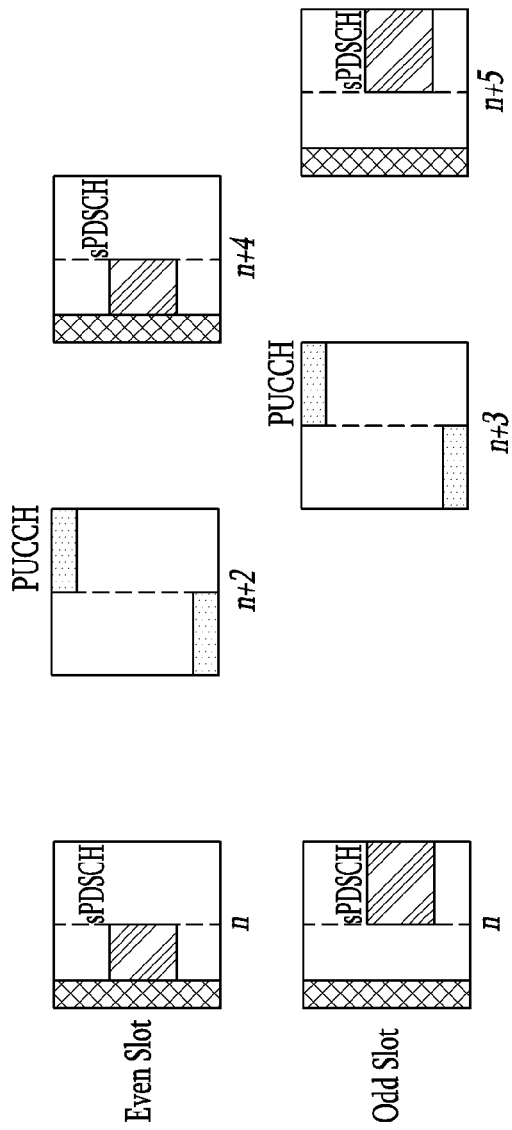
FIG. 7 is a diagram schematically illustrating a method for allocating HARQ feedback resource for quick retransmission according to an exemplary embodiment of the present invention.

FIG. 7 is a diagram schematically illustrating a method for allocating HARQ feedback resource for quick retransmission according to an exemplary embodiment of the present invention.

For more quick retransmission, the base station may perform just after it receives slot 1 decoding in the procedure of receiving PUCCH consisting of two slots and perform the transmission processing of the retransmission data according to the decoding result. At this point, if the HARQ feedback is received at subframe n, the base station may perform the retransmission at minimum subframe n+2. However, if the result of the decoding performed using the slot 1 is NACK but the result of the decoding performed using both of two slots is ACK, an unnecessary retransmission may be performed and thus the efficiency of the resource use may be reduced. To prevent the above problem, if the result of the decoding performed using both of the two slots is ACK, the base station may cancel the retransmission and may use the resource allocated for retransmission for new data or data to be transmitted to other terminals. For the operation, an operation of preparing reserved transmission using parallel processing may be required.

Referring to FIG. 7, if the sPDSCH is allocated to even numbered slots (slot 0), the HARQ feedback resources are located at each slot of subframe n+2. Further, if the sPDSCH is allocated to odd numbered slots (slot 1), the HARQ feedback resources are located at each slot of subframe n+3.

Figure 8:
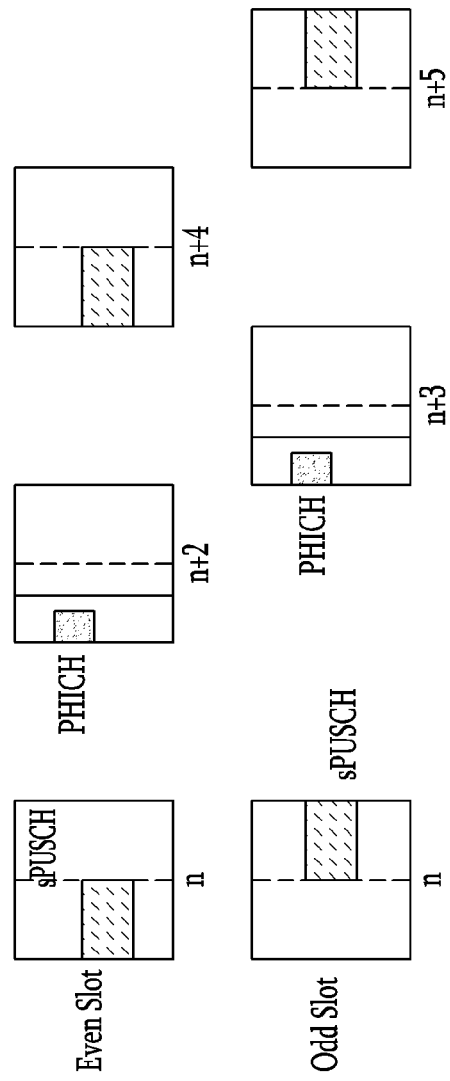
FIG. 8 is a diagram schematically illustrating a HARQ feedback and retransmission procedure for uplink data according to an exemplary embodiment of the present invention.

FIG. 8 is a diagram schematically illustrating a HARQ feedback and retransmission procedure for uplink data according to an exemplary embodiment of the present invention.

In FIG. 8, a minimum time when feedback may be transmitted after the data transmission timing is defined as 3 times of the transmission time unit (slot). The transmission procedure of the HARQ feedback for the uplink data will be described below with reference to FIG. 8.

First, the base station supporting the slot TTI transmits the HARQ feedback for the sPUSCH, which is received at slot s of subframe n-k, at subframe n. k and s at the HARQ feedback for the uplink data are 2 and 0 or 3 and 1 for all n.

A PHICH group ($n_{PHICH}^{group}$) and a permutation ($n_{PHICH}^{seq}$) that are the downlink feedback resource for the PUSCH of subframe n−4 are each represented by the following Equation 4.

$$n_{PHICH}^{group} = (I_{PRB\_RA} + n_{DMRS}) \bmod N_{PHICH}^{group}$$

$$n_{PHICH}^{seq} = (\lfloor I_{PRB\_RA}/N_{PHICH}^{group} \rfloor + n_{DMRS}) \bmod 2N_{SF}^{PHICH} \quad \text{(Equation 4)}$$

In the Equation 4, $I_{PRB\_RA}$ is a variable for determining the PHICH group and the permutation. $I_{PRB\_RA}$ is defined as $I_{PRB\_RA}^{lowest\_index}$ that is the smallest PRB index of the uplink transmission in a first transmission block for the PUSCH and is defined as $I_{PRB\_RA}^{lowest\_index}+1$ in a second transmission block.

If the same feedback resource is applied to the PUSCH transmitted at slot 0 of subframe n−2 or slot 1 of subframe n−3, a collision of the PUSCH transmitted at subframe n−4 with the feedback resource may occur. For this purpose, like the uplink feedback channel, $n_{PHICH}^{group}$ may be set so that the feedback resource (i.e., PHICH group) is increased to three times and the feedback for the PUSCH of slot 1 of subframe n−3 and slot 0 of subframe n−2 in an added two-fold PHICH group may be transmitted.

Alternatively, if the lowest PRB index among the resources for the sPDSCH is equal to the lowest PRB index of the PDSCH resource of subframe n−4, it is possible to prevent the feedback resources from colliding with each other using an indicator that makes the ΔSRO of the control message for the resource allocation have a preset value (e.g., 2 or $N_{PRB}$). The feedback resources for the sPDSCH of different slots may be differentiated by differently setting the ΔSRO value according to the slot number. For example, if the slot number is 1, the ΔSRO may be set to be 4 or $2N_{PRB}$ that is two times of the preset value.

The retransmission of the uplink data is synchronous and non-adaptive and the position of the retransmission resource of the uplink data is as follows. For the PHICH received at subframe n, the retransmission is performed at slot s of subframe n+k. In this case, k is 2 and s is a number of slot at which the feedback of the PHICH is performed.

Figure 9:
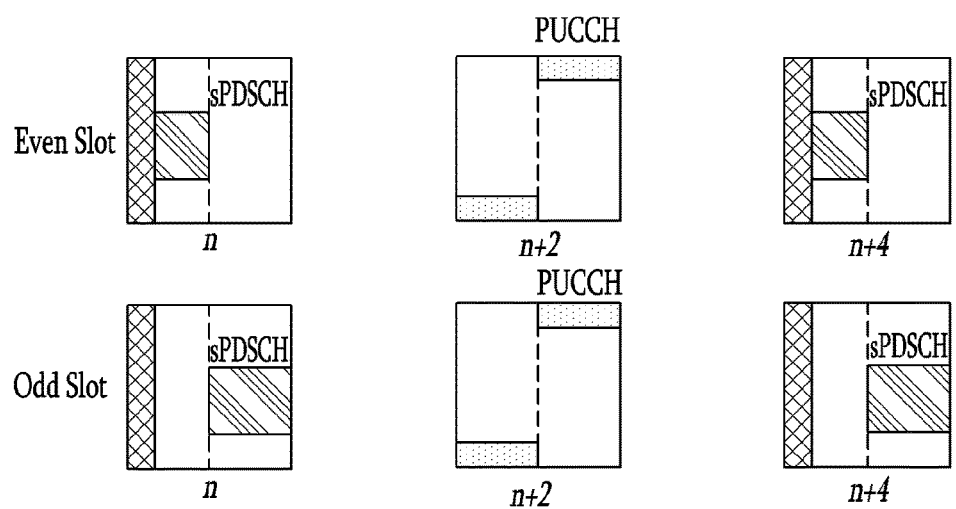
FIG. 9 is a diagram schematically illustrating a method for allocating a HARQ feedback resource where feedback report timing is unified, corresponding to FIG. 7.
Figure 10:
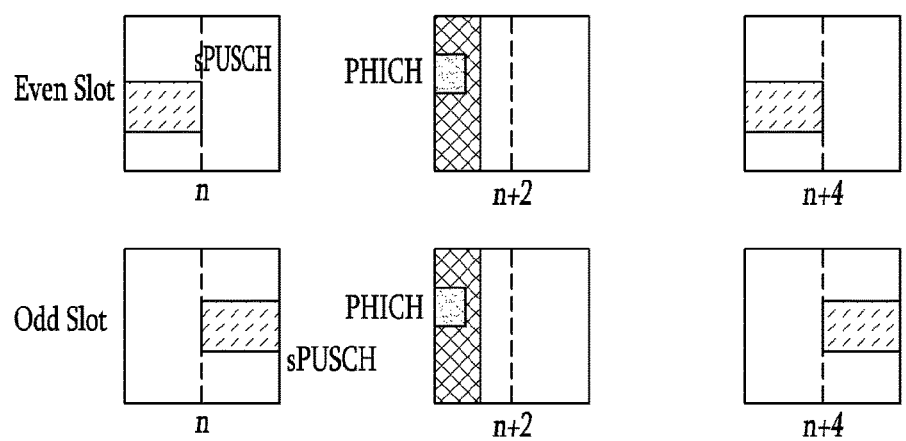
FIG. 10 is a diagram schematically illustrating a HARQ feedback and retransmission procedure where feedback report timing is unified, corresponding to FIG. 8.

FIG. 9 is a diagram schematically illustrating a method for allocating a HARQ feedback resource where feedback report timing is unified, corresponding to FIG. 7 and FIG. 10 is a diagram schematically illustrating a HARQ feedback and retransmission procedure where feedback report timing is unified, corresponding to FIG. 8.

Meanwhile, referring to FIGS. 7 and 8, the report timing of the HARQ feedback is changed according to a transmission slot number within the subframe. If a size of the maximum transmission block of the sPDSCH or the sPUSCH transmitted at the second slot is limited to perform the reception and transmission for the feedback transmission in one subframe (including two slots) in the future, the feedback report timing may be unified into one regardless of the transmission slot number. In this case, the base station limits the maximum size of the transmission block allocated at the time uplink or downlink scheduling at different slots to perform the scheduling and the terminal is operated according to the processing time and the transmitting/receiving timing that are differently defined according to the slot number (refer to FIGS. 9 and 10).

According to an exemplary embodiment of the present invention, different HARQ process ID pools are used for legacy TTI transmission and TTI transmission in a slot unit. That is, a process ID for the HARQ operation of the legacy TTI transmission and a process ID for the HARQ operation of the TTI transmission in a slot unit are different from each other. At this point, the process ID pool may be determined by a kind of resource allocation messages or a resource allocation field (field for determining subframe or slot TTI allocation) of the resource allocation message.

A data transmission (e.g., PDSCH) of a subframe length and a data transmission (e.g., sPDSCH) of a slot length may support the retransmission through different channels. At this point, the retransmission may be performed by switching the process ID pool. For example, if the retransmission for the data transmitted in the sPDSCH is performed through the PDSCH, the resource allocation for the retransmission is performed in the PDSCH resource allocation and the control information may include a process ID pool switching indicator. The process ID pool switching indicator is to notify that the switching of the process ID pool is performed and Table 1 shows an example of the process ID pool switching indicator.

TABLE 1

| parameter | length/Value | Description |
| --- | --- | --- |
| Process ID Pool Switching Indicator | 1 bit | Indicator notifying that the process ID pool is switched If the process ID pool switching bit is set, the HARQ process ID of the resource allocation control message means a process at different pools. |

Figure 11A:
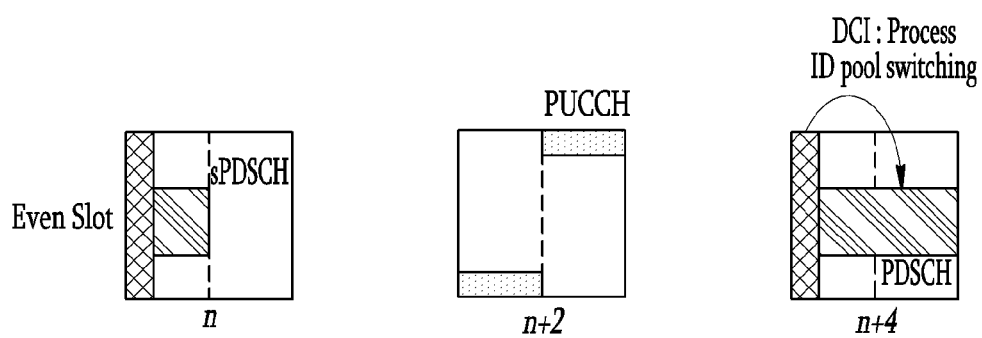
FIGS. 11A and 11B are schematic diagrams illustrating a process ID pool switching method according to an exemplary embodiment of the present invention.
Figure 11B:
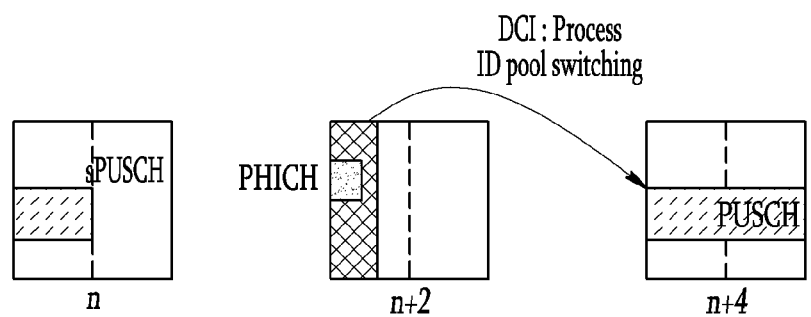

FIGS. 11A and 11B are schematic diagrams illustrating a process ID pool switching method according to an exemplary embodiment of the present invention.

Referring to FIG. 11A, the retransmission for the sPDSCH at subframe n is performed through the PDSCH of subframe n+4. Next, the HARQ feedback timing for the retransmission is performed based on the PDSCH (i.e., subframe n+4) and the HARQ process maintains the process ID of the initial transmission. Referring to FIG. 11B, the process ID pool switching is performed even in the uplink data transmission (i.e., PUSCH) and thus the retransmission for the sPUSCH may be performed in the PUSCH.

Figure 12:
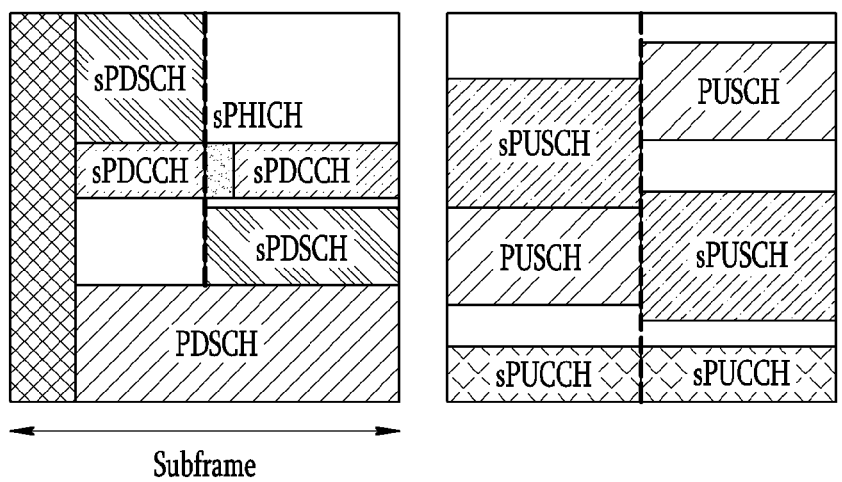
FIG. 12 is a schematic view illustrating a slot unit TTI using a short transmission time interval (sTTI) specific channel according to an exemplary embodiment of the present invention.

FIG. 12 is a schematic view illustrating a slot unit TTI using short transmission time interval (sTTI) specific channels according to an exemplary embodiment of the present invention.

In FIG. 12, the sPDSCH and the sPUSCH are a short downlink data channel and a short uplink data channel and are transmitted/received in a slot unit. In the resource allocation using the short channel, the sPDSCH and sPUSCH resources may be allocated through the legacy PDCCH or EPDCCH and the sPDCCH that is the short control channel.

When the resource allocation is performed through the legacy PDCCH or EPDCCH or the resource allocation is performed through the sPDCCH of the first slot, the legacy PDCCH, EPDCCH, and sPDCCH may include the RAP field described above and the resource may be allocated in various subframes and various slot units by the RAP field.

According to an exemplary embodiment of the present invention, the HARQ feedback for data transmitted to the downlink and uplink may be transmitted through the sPUCCH and the sPHICH that are the control channel in the slot unit TTI. Further, the downlink HARQ feedback transmitted at the first slot may be transmitted even through the legacy PHICH. At this point, the sPHICH may not be configured at the first slot.

Figure 13:
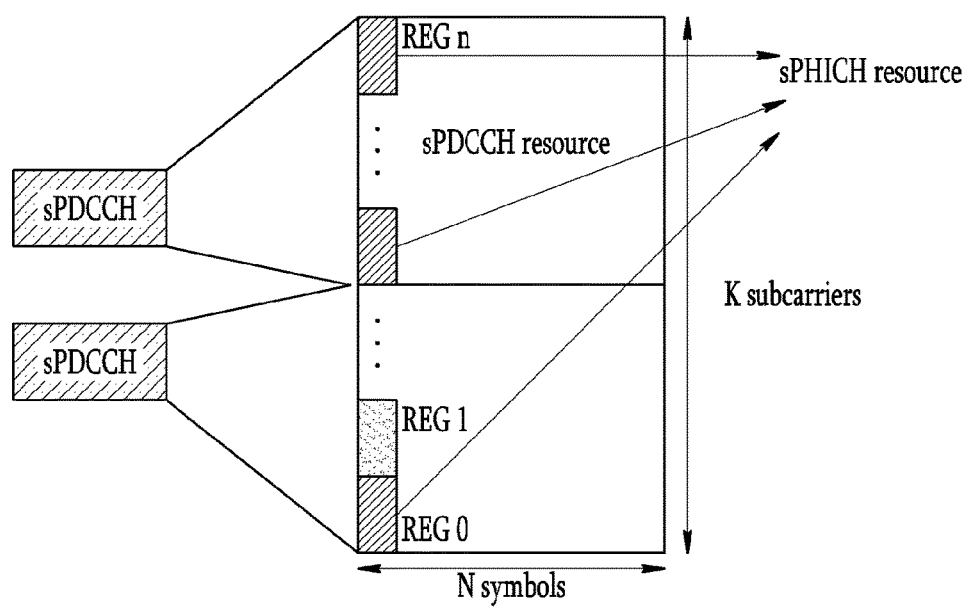
FIG. 13 is a diagram schematically illustrating a resource configuration method of sPHICH according to an exemplary embodiment of the present invention.

FIG. 13 is a diagram schematically illustrating a resource configuration method of sPHICH according to an exemplary embodiment of the present invention.

According to the exemplary embodiment, the sPHICH may be positioned at a part of the resource where the sPDCCH that is the downlink short control channel is positioned. At this point, for the quick reception of the feedback, the sPHICH may be positioned at a head portion of the sPDCCH resource (e.g., first symbol in the slot). The sPHICH may be positioned at both of sPDCCHs that are positioned at the first and second slots.

FIG. 13 illustrates that the first symbol of the resource region where the sPDCCH is allocated. The first symbol of the resource region to which the sPDCCH is allocated is divided into a resource element group (REG) unit (four symbol units) and the sPHICH is allocated to three REGs among the divided REGs. The rest resources to which the sPHICH is not allocated at the first symbol and the sPDCCH resource as the resource after the first symbol may be used.

Even when the sPHICH channel allocates the sPDCCH to the second slot, the method illustrated in FIG. 13 may be used. However, if the sPDCCH is not allocated to the second slot, the method of FIG. 13 may not be applied. According to another method for configuring the sPHICH, the sPHICH is configured like the PHICH in the entire frequency band.

Figure 14:
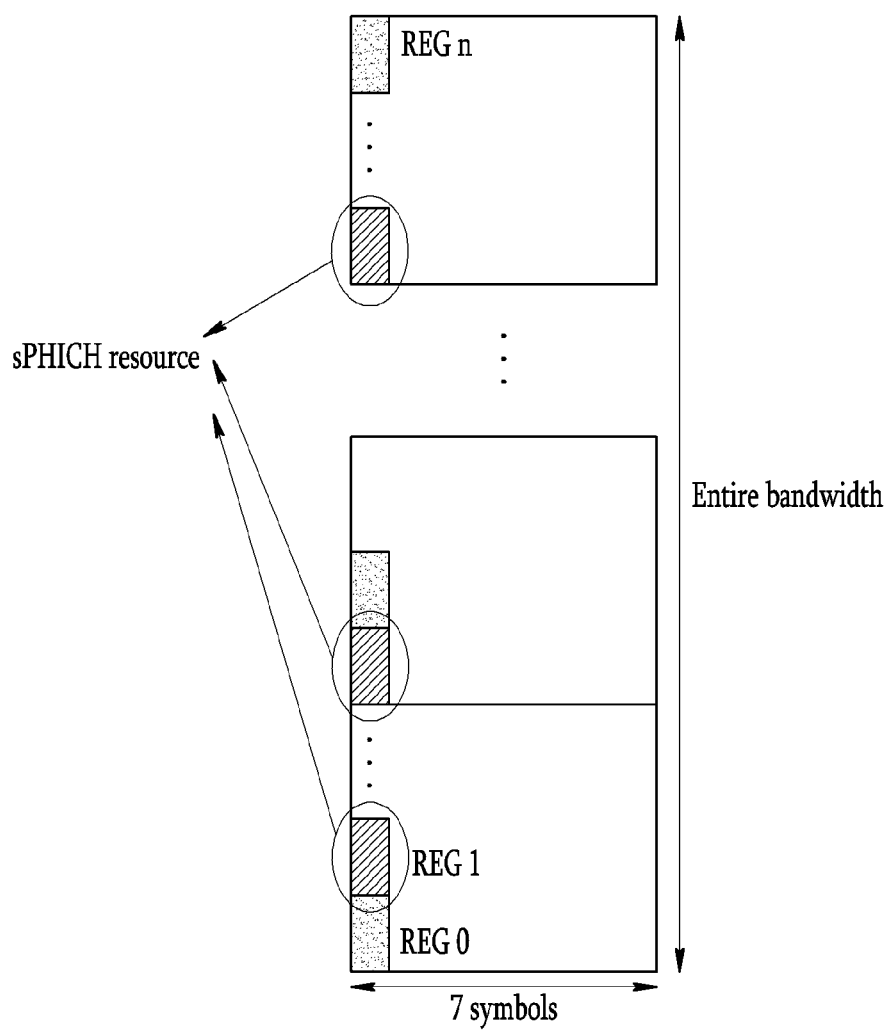
FIG. 14 is a diagram schematically illustrating a resource configuration method of sPHICH according to another exemplary embodiment of the present invention.

FIG. 14 is a diagram schematically illustrating a resource configuration method of sPHICH according to another exemplary embodiment of the present invention.

FIG. 14 illustrates a method for configuring a sPHICH resource in a second slot. In FIG. 14, the second slot configures the REG in the entire band and the sPHICH is allocated in an REG unit. The resource allocated to the sPHICH is used to transmit the HARQ feedback to the sTTI specific terminal even if it is allocated to transmit data of another legacy UE. If the sPHICH is configured using the resource allocated for the data transmission of the legacy terminal, the data transmission quality of the legacy terminal may be degraded but a ratio of the sPHICH resource to the entire frequency resource is low, and therefore a degradation degree is not so large. When the sPHICH is configured as illustrated in FIG. 14, the configuration information of the sPHICH is transmitted to the sTTI specific terminal through the upper layer. Further, the data channel allocated for the sTTI specific terminal is allocated to the resource region other than the sPHICH, such that the performance of the data transmission of the sTTI specific terminal is not degraded due to the sPHICH.

Figure 15:
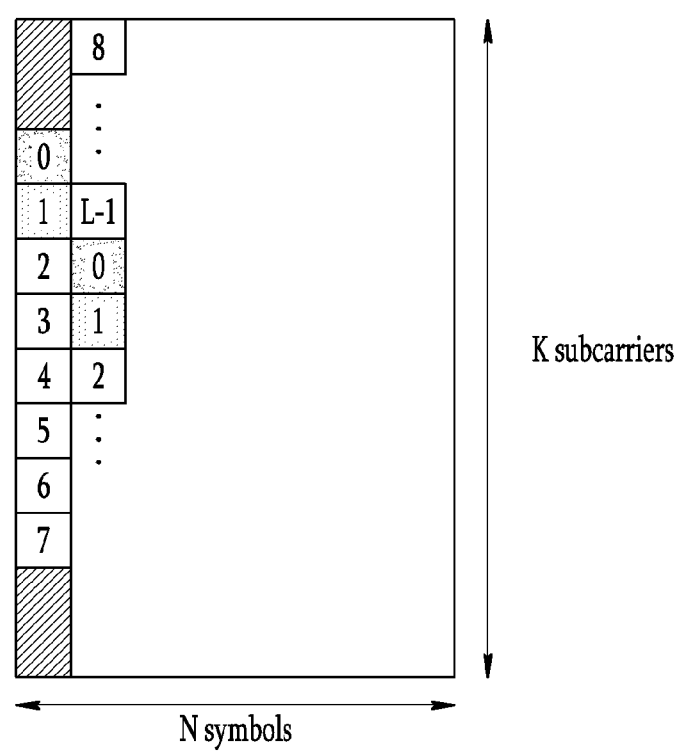
FIG. 15 is a diagram schematically illustrating a resource configuration method of sPDCCH according to an exemplary embodiment of the present invention.

FIG. 15 is a diagram schematically illustrating a resource configuration method of sPDCCH according to an exemplary embodiment of the present invention.

FIG. 15 illustrates sREG for the sPDCCH allocated within one resource block. In FIG. 15, the number of sREGs included in one resource block is L number and a plurality of REs included in one sREG are each positioned at different symbols and different subcarriers. The L representing the number of sREGs included in one resource block may be 16 and may be adjusted according to the number of symbols used as the sPDCCH. In the number (up to 7) of symbols used as the sPDCCH in a slot unit, except for the symbol for the legacy PDCCH or the resource for the sPHICH, the number of REs included in the sREG is greatly reduced. To prevent the same, the number of sREGs may be preset and the number of REs included in the sREG may be adjusted. The L may be differently defined in an odd numbered slot and an even numbered slot, respectively. The L of the first slot may be differently defined according to the number of symbols for the PDCCH.

The sPDCCH resource is allocated to the sTTI specific terminal and may be set by the upper layer. For example, a sPDCCH-config parameter may be used. The following Table 2 shows a parameter included in the sPDCCH-conFIG parameter.

TABLE 2

| parameter | length/Value | Description |
| --- | --- | --- |
| subframePattern | 40 bits | Parameter setting the subframe pattern for the terminal to search the UE specific search space in the sPDCCH If the value of the corresponding bit is 1, search in the corresponding subframe number. |
| sPDCCH-slotPattern | 2 bits | Parameter setting a slot pattern for searching the UE specific search space of the sPDCCH within the subframe. If the value of the corresponding bit is 1, search in the corresponding slot number. |
| sPHICH-slotPattern | 2 bits | Parameter setting the search of the sPHICH resource within the subframe. If the value of the corresponding bit is 1, search the sPHICH in the corresponding slot number. When the slot number to be searched by sPHICH-slotPattern is set in sPDCCH-slotPattern, the sPHICH resource is configured in the sPDCCH resource to perform the search or otherwise, the sPHICH is searched in the entire frequency band. |
| sPHICH-resources | 2 bits | Ng value for the sPHICH (⅙, ½, 1, 2) |
| resourceAllocationType | 1 bit | 0: Bitmap allocation of VRBs with localized mapping 1: Bitmap allocation of VRBs with distributed mapping |

TABLE 2-continued

| parameter | length/Value | Description |
|---|---|---|
| resourceAllocationBits | 6-100 bits | Allocation bitmap of VRBs |
| numberOfsREGs | 4 bits | The number of sREGs per RB (L of FIG. 12) |

Figure 16:
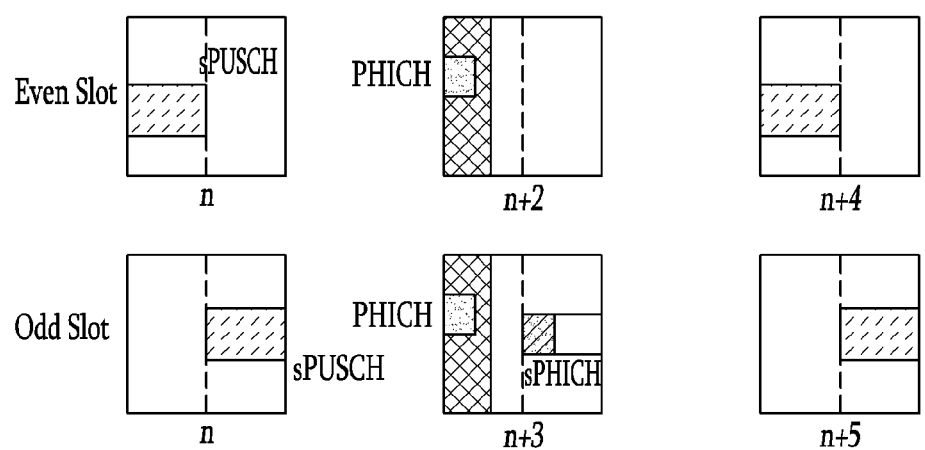
FIG. 16 is a diagram schematically illustrating a method for transmitting downlink HARQ feedback for uplink data transmission according to an exemplary embodiment of the present invention.
Figure 17:
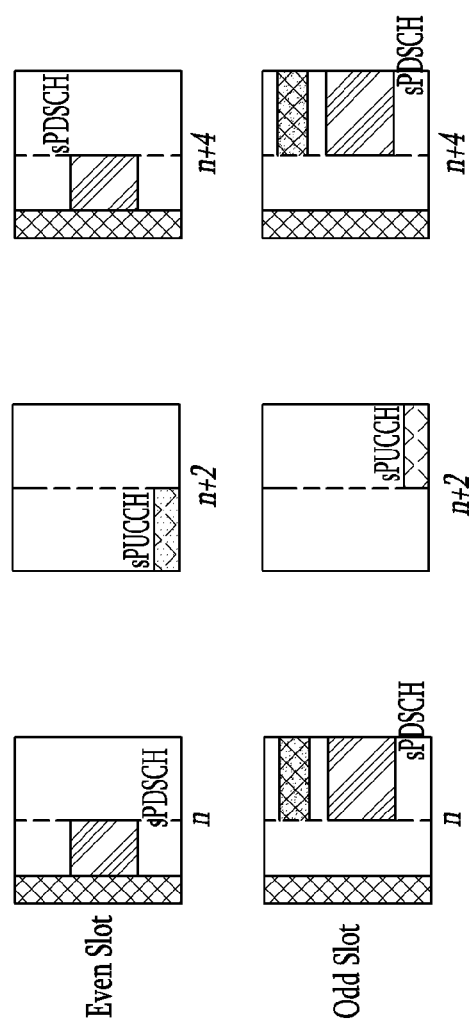
FIG. 17 is a diagram schematically illustrating a method for transmitting uplink HARQ feedback for downlink data transmission according to an exemplary embodiment of the present invention.

FIG. 16 is a diagram schematically illustrating a method for transmitting downlink HARQ feedback for uplink data transmission according to an exemplary embodiment of the present invention and FIG. 17 is a diagram schematically illustrating a method for transmitting uplink HARQ feedback for downlink data transmission according to an exemplary embodiment of the present invention.

Referring to FIG. 16, the HARQ feedback channel of the first slot (even slot) uses the legacy PHICH and the HARQ feedback channel of the second slot (odd slot) uses the sPHICH.

According to the exemplary embodiment of the present invention, when the feedback for the uplink PUSCH and the sPUSCH is transmitted through the PHICH in the first slot, the PUSCH of subframe n−4 and the feedback for the sPUSCH of slot of subframes n−2 and 0 may collide with each other. To solve the same, a method for avoiding a dynamic feedback resource collision using an indicator of a resource allocation control message or a method for transmitting a feedback for sPUSCH in a second resource by allocating a PHICH resource two times may be used. Meanwhile, the feedback for the sPUSCH transmitted through the sPHICH of the first or second slot does not collide with the feedback for the legacy PUSCH.

A slot structure of PUCCH format 1/1a/1b of LTE may be reused in the sPUCCH that is the control channel for transmitting the uplink HARQ feedback. In this case, the sPUCCH may also be allocated to the resource to which the PUCCH format 1/1a/1b is allocated. If a specific phase shift is applied to one of the two slots, the legacy PUCCH format 1/1a/1b is not reused for the sPUCCH. Therefore, a scheduling method for preventing legacy PDSCH and HARQ feedback for sPDSCH from colliding with each other and a feedback resource allocation method are required. For example, like the method for transmitting feedback using a legacy channel like PUCCH, the method for avoiding a dynamic resource collision through an indicator of a control message or the method for avoiding a resource collision through a separation of a feedback resource may be present. At this point, in the two methods, the feedback resources between slots (slot 0 and slot 1) do not collide with each other and therefore the inter-slot collision avoidance is not considered.

Meanwhile, even when the control channel of the slot unit TTI is used, the process ID pool switching operation is similar to that illustrated in FIGS. 11A and 11B.

Figure 18:
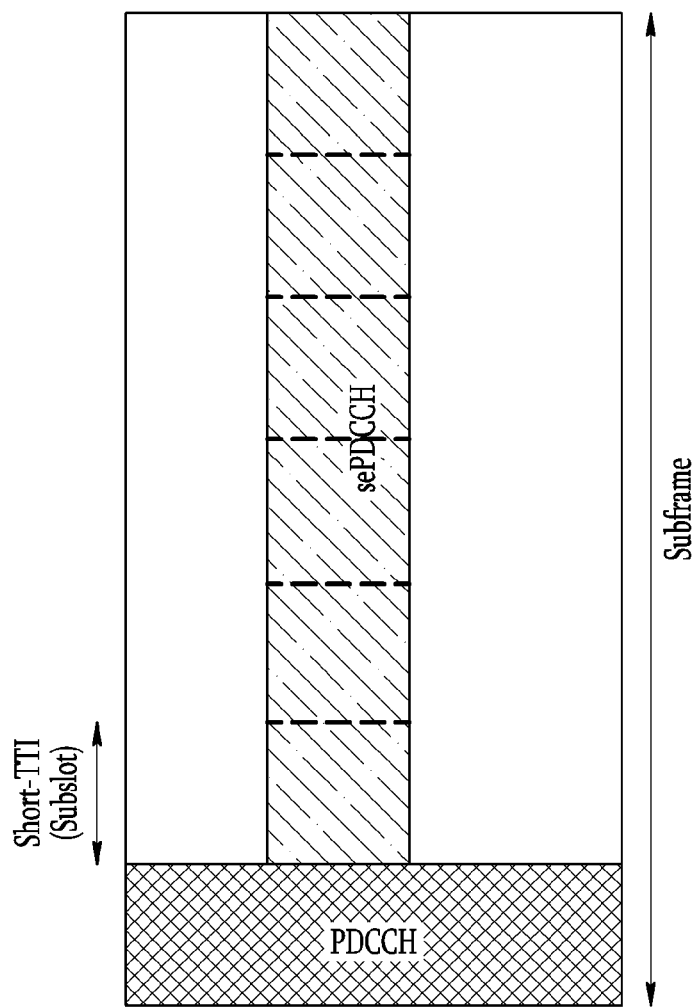
FIG. 18 is a diagram schematically illustrating a sTTI specific control channel of a frequency multiplexing type according to an exemplary embodiment of the present invention.

FIG. 18 is a diagram schematically illustrating a short control channel of a frequency multiplexing type according to an exemplary embodiment of the present invention.

Referring to FIG. 18, the PDCCH is allocated to a head part of one subframe and a part of the frequency band of the rest region to which the PDCCH is not allocated is allocated to the short-TTI region. Further, a short enhanced PDCCH (sePDCCH) is allocated to the short-TTI region. The allocation information of the sePDCCH may be transmitted to the sTTI specific terminal through the legacy control channel (PDCCH) or the upper layer signaling.

When the sePDCCH allocation information is transmitted to the sTTI specific terminal through the PDCCH, the sePDCCH allocation information may be different per each subframe. In this case, the sePDCCH allocation information transmitted through the PDCCH includes the information on the resource block assignment and the sPHICH configuration.

Meanwhile, when the terminal performing the sTTI specific operation generates the upper layer connection (e.g., RRC), the sePDCCH allocation information may be transmitted to the sTTI specific terminal. The sePDCCH allocation information may be changed through a reconfiguration procedure of the upper layer connection information. In this case, the sePDCCH allocation information transmitted through the upper layer may include information on a subframe pattern, a start symbol, the number of PRB pairs, the resource block assignment, and the sPHICH configuration.

Figure 19:
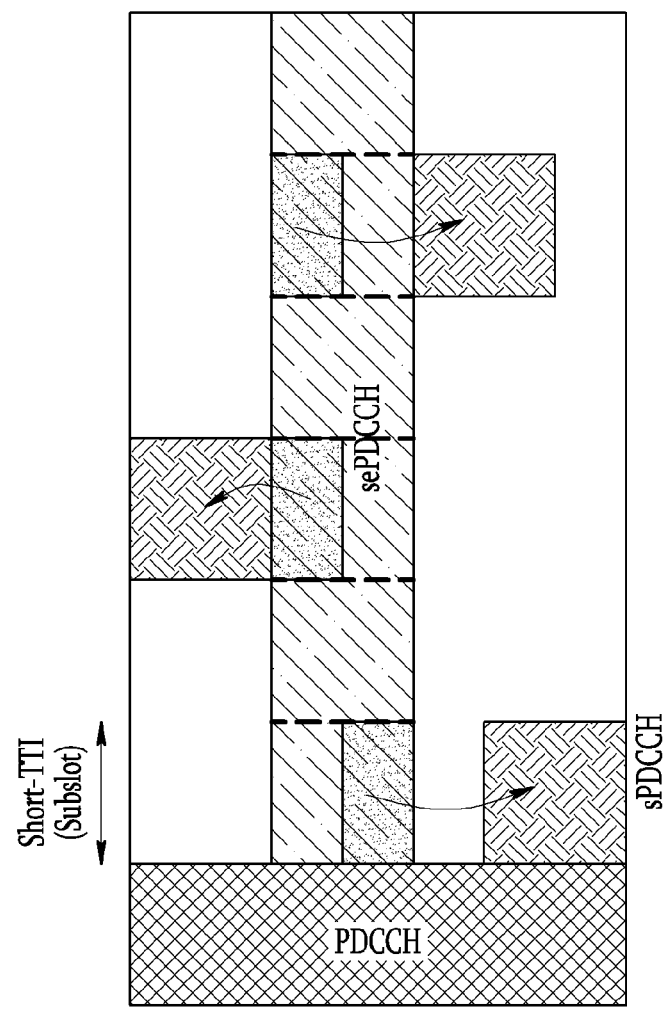
FIG. 19 is a diagram schematically illustrating a method for allocating a sTTI specific data channel using sePDCCH according to an exemplary embodiment of the present invention.

FIG. 19 is a diagram schematically illustrating a method for allocating a short data channel using sePDCCH according to an exemplary embodiment of the present invention.

Referring to FIG. 19, the sePDCCH allocates some of the resources located above and under the sePDCCH to the sPDSCH (short data channel). As illustrated in FIG. 19, for the sePDCCH to allocate the sPDSCH, the sePDCCH requires information on short resource block assignment, a transmission format (e.g., modulation and coding scheme (MCS), precoding information, or the like), and HARQ information (e.g., HARQ process ID, new data indication, or the like). The information on the short resource block assignment means the resource allocation information occupied by the sTTI specific data transmission. At this point, the resource allocation information occupied for the sTTI specific data transmission is configured based on the entire frequency band and the resource allocation information may be present by the following two methods.

First, the legacy resource allocation information may be used as the resource allocation information occupied for the sTTI specific data transmission as it is. It is an advantageous method for coexistence with the legacy data channel but has a disadvantage of increasing the size of the resource allocation information.

Second, a method for newly defining resource allocation information for sTTI specific data transmission. For example, a larger resource allocation unit like the sRBS (sRB SET), or the like may be defined and the resource allocation may be performed. According to the second method, the size of the resource allocation information may be reduced. However, since the sRBS is newly configured in the entire frequency domain, restrictions may occur in the resource allocation for the legacy UE when the sRBS is largely configured. Hereinafter, a method for configuring sRBS that is a resource allocation unit larger than the legacy RB will be described.

First, a method for determining a size of resource allocated to sRBS may be used. In this case, the parameter representing the number of sRBs included in one sRBS is $N_{sRB}{}^{sRBS}$. At this point, $N_{sRBS}$ that is the number of sRBSs is equal to the following Equation 5.

$$N_{sRBS} = \left\lceil \frac{N_{sRB}}{N_{sRB}^{sRBS}} \right\rceil \quad \text{(Equation 5)}$$

In the above Equation 5, $N_{sRB}$ is the number of sRBs present in the entire bandwidth. If the remainder of dividing NsRB by $N_{sRBS}{}^{sRB}$ is not 0, the number of sRBs included in the final sRBS is as the following Equation 6.

$$N_{sRB} - \left\lfloor \frac{N_{sRB}}{N_{sRB}^{sRBS}} \right\rfloor \times N_{sRB}^{sRBS} \quad \text{(Equation 6)}$$

When the size of sRBS is determined, the disposition of the DMRS needs to be considered. When the short data channel is configured, to reduce the overhead of the DMRS, the DMRS pattern may not be configured per each sRB and the DMRS pattern may be configured for sRB of a predetermined period ($P_{DMRS}$). At this point, a minimum size of each sRBS is $P_{DMRS}$ and a size of the sRBS may be an integer multiple of $P_{DMRS}$. Alternatively, the DMRS pattern may be disposed in consideration of the size of the sRBS. For example, if the number of sRBSs is many and the number of sRBs included in the sRBS is few, the DMRS pattern is disposed to be included in a small size of sRBS.

Second, a method for fixing the number of sRBSs and determining the number of sRBs included in sRBS may be used. In this case, if the remainder of dividing $N_{sRB}$ by $N_{sRBs}$ is not 0, the number of sRBs included in $N_{sRBs}-1$ sRBSs is as the following Equation 7.

$$\left\lfloor \frac{N_{sRB}}{N_{sRBS}} \right\rfloor \quad \text{(Equation 7)}$$

Further, the number of sRBs included in the final one sRBS is as the following Equation 8.

$$N_{sRB} - \left( (N_{sRBS} - 1) \times \left\lfloor \frac{N_{sRB}}{N_{sRBS}} \right\rfloor \right) \quad \text{(Equation 8)}$$

Similar to the first method, the size of each sRBS may be set in consideration of the number of sRBs in which the DMRS is disposed.

Meanwhile, when the resource allocation is performed in the sRBS unit, the configuration method of the sRBS and the related parameter are the sTTI specific system information and need to be transmitted to the sTTI specific terminal in advance.

Figure 20:
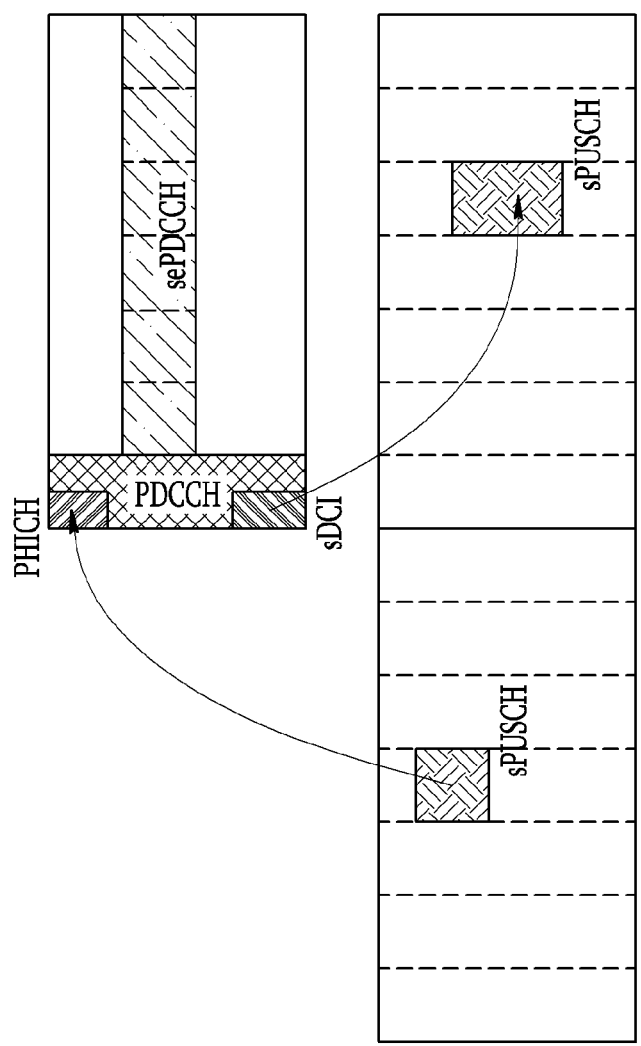
FIG. 20 is a diagram schematically illustrating a method for allocating a sTTI specific data and feedback resource using legacy PDCCH according to an exemplary embodiment of the present invention.

FIG. 20 is a diagram schematically illustrating a method for allocating a sTTI specific data and feedback resource using legacy PDCCH according to an exemplary embodiment of the present invention.

When the legacy system and the control channel coexist, the number of TTIs of downlink may be smaller than the number of TTIs of uplink. For example, in FIG. 19, if the length of the PDCCH is 2 symbols and the length of the short-TTI is 2 symbols, the number of short-TTIs of downlink is 6 per subframe and the number of short-TTIs of uplink is 7 per subframe. At this point, since the short control channel is configured in the downlink TTI unit, if the number of TTIs of downlink included in one subframe is smaller than the number of TTIs of uplink, the resource allocation of some uplink data and the feedback transmission therefor may not be made. To solve the problem, the resources for the short data channel and feedback may be allocated through the legacy PDCCH resource.

Referring to FIG. 20, the feedback for the sPUSCH is transmitted in the legacy PDCCH resource and the control channel for the sPUSCH is located in the legacy PDCCH resource. In FIG. 20, the uplink data are transmitted in an n-th TTI, the feedback therefor is transmitted in an n+4-th TTI, and the uplink resource of an n+4-th TTI is allocated in the n-th TTI.

As illustrated in FIG. 20, to allocate the sPUSCH resource through the legacy PDCCH, the sTTI support terminal needs to search a sDCI format separately from the legacy DCI format of the PDCCH. The search of the SDCI is performed only in the UE-based search space of the terminal and is performed only in a type for the uplink resource allocation. Further, an aggregation level that may be configured in the sDCI may be differently defined from the legacy DCI. To reduce the processing overhead generated to search the sDCI in the PDCCH, the terminal may omit the search of the sDCI in the subframe in which the sTTI specific uplink resource allocation is not performed. The terminal in which the sTTI specific uplink resource allocation is not performed in subframe n satisfies the following condition.

Terminal for performing uplink transmission in subframe n by allocating uplink resource in subframe n−4
Terminal for receiving downlink data in subframe n−4 and transmitting uplink feedback in subframe n The terminal transmitting the uplink data in an n−4-th short-TTI receives the HARQ ACK/NACK for the uplink data transmitted through the sPHICH of the n-th short-TTI. At this point, the HARQ group and sequence for receiving the HARQ ACK/NACK are determined as the following Equation 9 by an index of the sPUSCH.

$$n_{PHICH}^{group} = (I_{PRB\_RA} + n_{DMRS}) \bmod N_{PHICH}^{group} + I_{PHICH} N_{PHICH}^{group}$$

$$n_{PHICH}^{seq} = (\lfloor I_{PRB\_RA}/N_{PHICH}^{group} \rfloor + n_{DMRS}) \bmod 2N_{SF}^{PHICH} \quad \text{(Equation 9)}$$

In the above Equation 9, $I_{PRB\_RA}$ is the lowest PRB index of the transmission block transmitted to the sPUSCH. At this point, the feedback resource for the sPUSCH received in the base station and the feedback resource for the legacy LTE PUSCH data may collide with each other. To prevent the collision, when the base station is expected to be fed back to the PHICH, the resource allocation information includes information $\Delta_{ARO}$ on an ACK resource offset (ARO) to prevent the feedback resource for the sPUSCH and the feedback resource for the legacy PUSCH from colliding with each other. According to the exemplary embodiment of the present invention, the PHICH resource for the sPUSCH data is determined by the following Equation 10 based on the $\Delta_{ARO}$.

$$n_{PHICH}^{group} = (I_{PRB\_RA} + n_{DMRS} \Delta_{ARO}) \bmod N_{PHICH}^{group} + I_{PHICH} N_{PHICH}^{group}$$

$$n_{PHICH}^{seq} = (\lfloor I_{PRB\_RA}/N_{PHICH}^{group} \rfloor + n_{DMRS} \Delta_{ARO}) \bmod 2N_{SF}^{PHICH} \quad \text{(Equation 10)}$$

The $\Delta_{ARO}$ may be included in the sDCI for the sPUSCH resource allocation and the following Table 3 shows a type of $\Delta_{ARO}$.

TABLE 3

| ARO field | ARO value |
|---|---|
| 00 | 0 |
| 01 | 4 |
| 10 | 8 |
| 11 | 12 |

In the uplink transmission using the short-TTI, for the synchronous HARQ operation, the sPHICH needs to be configured as described above. To reduce the overhead of the sPHICH in the downlink, the sPHICH may not be configured. At this point, the HARQ feedback for the uplink transmission may be operated by the asynchronous scheme. The feedback resource for the uplink transmission may be allocated through the sDCI through the sPDCCH that is the downlink.

Figure 21:
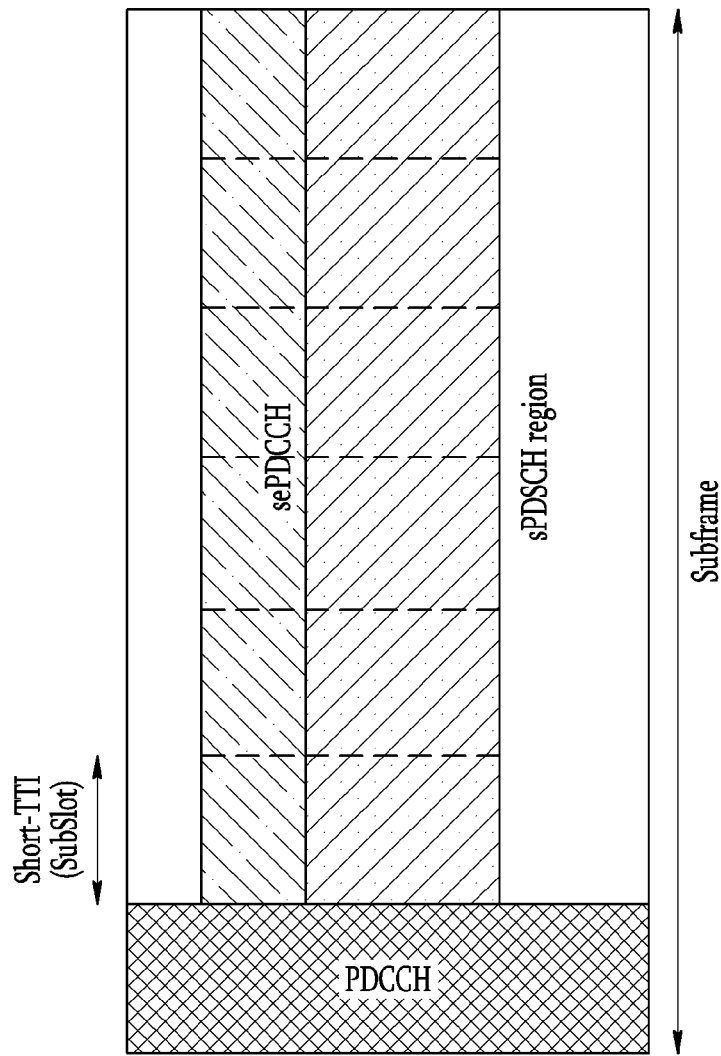
FIG. 21 is a diagram schematically illustrating a downlink sTTI specific data channel according to an exemplary embodiment of the present invention.
Figure 22:
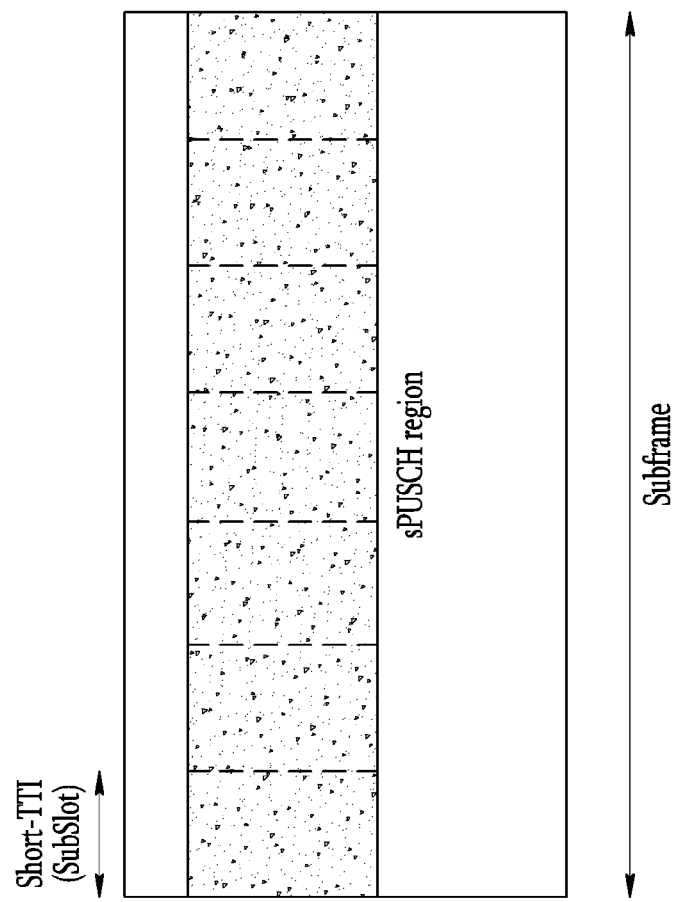
FIG. 22 is a diagram schematically illustrating an uplink sTTI specific data channel according to an exemplary embodiment of the present invention.

FIG. 21 is a diagram schematically illustrating a downlink short data channel according to an exemplary embodiment of the present invention and FIG. 22 is a diagram schematically illustrating an uplink short data channel according to an exemplary embodiment of the present invention.

Referring to FIG. 21, the downlink sTTI specific data channel (i.e., sPDSCH) may be allocated to the sPDSCH region and referring to FIG. 22, the uplink sTTI specific data channel (i.e., sPUSCH) may be allocated to the sPUSCH region.

As described in FIGS. 21 and 22, to allocate the short data channel to the sPDSCH region and the sPUSCH region, respectively, the resource configuration information within each region is required. In the uplink and downlink, as the method for configuring a short-TTI data resource in unit of a sRBS within each region, there are a method for determining the number of sRBs included in one sRBS in advance and a method for determining the whole number of sRBSs included in a region in advance. As illustrated in FIGS. 21 and 22, if the short-TTI data region is separately determined, the number of sRBSs in the short-TTI region may be reduced and the size of the resource allocation information included in the sDCI may be small.

Figure 23:
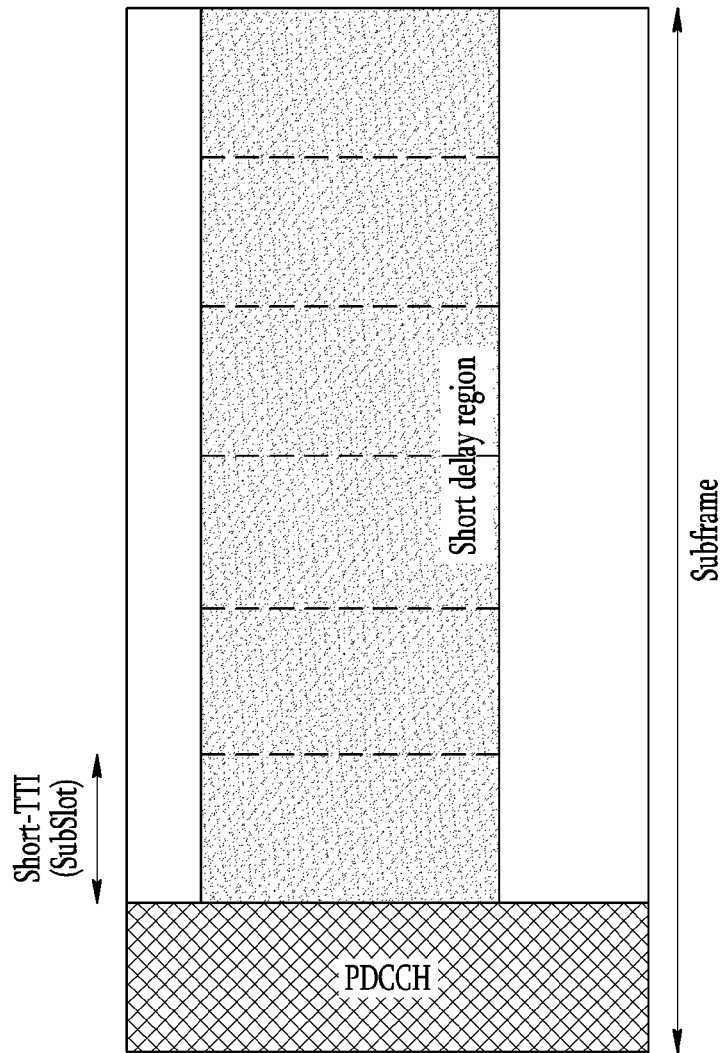
FIG. 23 is a diagram schematically illustrating a short-TTI region including a downlink sTTI specific control channel and a downlink sTTI specific data channel according to an exemplary embodiment of the present invention.

FIG. 23 is a diagram schematically illustrating a short-TTI region including a downlink short control channel and a downlink short data channel according to an exemplary embodiment of the present invention.

Referring to FIG. 23, the short-TTI region of each subslot includes the downlink short control channel (sPDCCH) and the downlink short data channel (sPDSCH). At this point, each subslot may have a shorter time length than a slot (seven OFDM symbol lengths) of the LTE standard, for example, one subslot may include two OFDM symbols. As the method for allocating a downlink short control channel and a downlink short data channel to a short-TTI region, a method for transmitting resource allocation information to a sTTI specific terminal through PDCCH of each subframe or a method for transmitting resource allocation information to a sTTI specific terminal through upper layer configuration information may be used.

Figure 24:
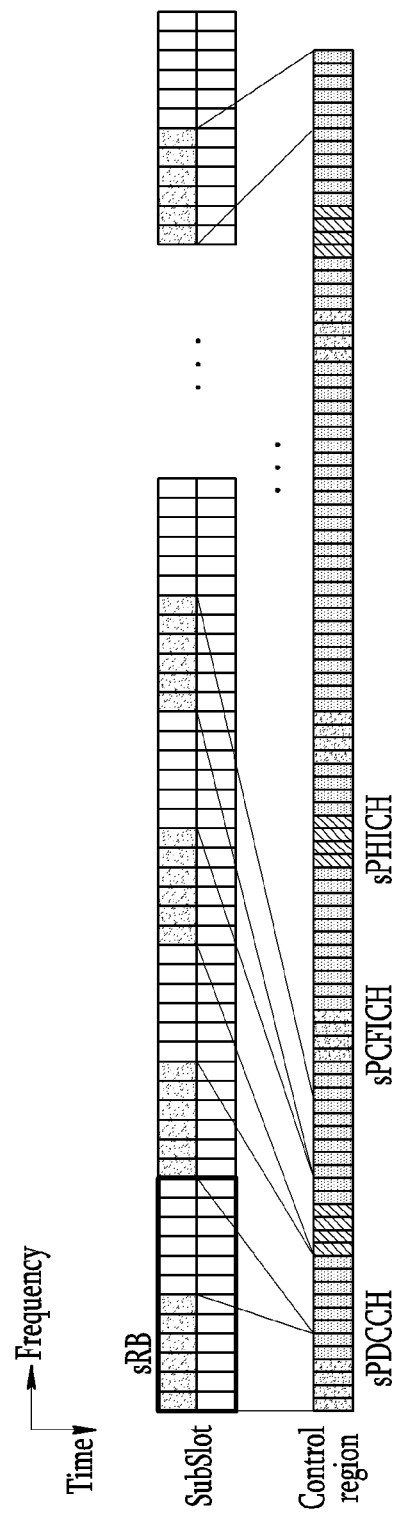
FIG. 24 is a diagram schematically illustrating sPDCCH allocated to a short-TTI region according to an exemplary embodiment of the present invention.

FIG. 24 is a diagram schematically illustrating sPDCCH allocated to a short-TTI region according to an exemplary embodiment of the present invention.

Referring to FIG. 24, in the sRB located in the short-TTI region of each subslot, the preset number of REs are allocated to the control region. That is, the RE included in the control region may be allocated as the respective control channels (sPDCCH, sPCFICH, sPHICH, or the like). Among the control channels within the control region, the sPCFICH and the sPHICH are transmitted to all the terminals located within a cell, and thus the control region including the sPCFICH or the sPHICH is transmitted based on the CRS. Even if the sPCFICH and the sPHICH are not present in the control region, to transmit the sPDCCH on the basis of the UE-specific RS, the DMRS needs to be separately present so that the terminal may receive the sPDCCH. At this point, the additional overhead may occur.

According to the exemplary embodiment of the present invention, the size of the control region may be determined on the basis of the number of REs included in the sRB. The following Table 4 shows the size (i.e., the number of REs per sRB) of the control region according to the sCFI value.

TABLE 4

| sCFI | The number of REs per sRB |
|---|---|
| 1 | 4 |
| 2 | 6 |
| 3 | 8 |

The sCFI may be transmitted per subslot and it is determined whether the sCFI is changed according to the transmission period (sCFI period) of the sCFI. The following Table 5 shows whether the sCFI is changed according to the transmission period of the sCFI.

TABLE 5

| sCFI Period | Whether sCFI is changed |
|---|---|
| 0 | Change per subslot |
| 1 | Change per subframe |
| 2 | No change |

In the above Table 5, the sCFI period may be transmitted along with the configuration information of the short-TTI region to the terminal or may be included in the upper layer configuration information.

When the sCFI is changed per subslot, the sPCFICH needs to be allocated to the control region of all the subslots. At this point, the terminal may receive the sCFI through the sPCFICH and configure the control region. When the sCFI is changed per subframe, the sPCFICH needs to be allocated to one subslot (e.g., first subslot of each subframe) included in each subframe and the sPCFICH is not configured in other subslots. At this point, the terminal may receive the sCFI in the subslot in which the sPCFICH is configured and configure the control region for each subslot included in the subframe.

When the sCFI is not changed, the sPCFICH is not allocated to all the subslots included in the subframe and the terminal configures the control region according to the preset sCFI value. In this case, the preset sCFI value is transmitted to the terminal along with the sCFI period.

When the number of REs per sRB is determined by the sCFI, the preset number of REs from the low index of the subcarrier of the first symbol of each sRB are configured as the control region. In this case, the RE to which the CRS is allocated is excluded from the control region.

The short data channel may be allocated to the rest REs other than the resource used as the control region in the short-TTI region. The short data channel includes the sRB of the short-TTI region and the resource allocation is performed in unit of a sRBS.

Figure 25:
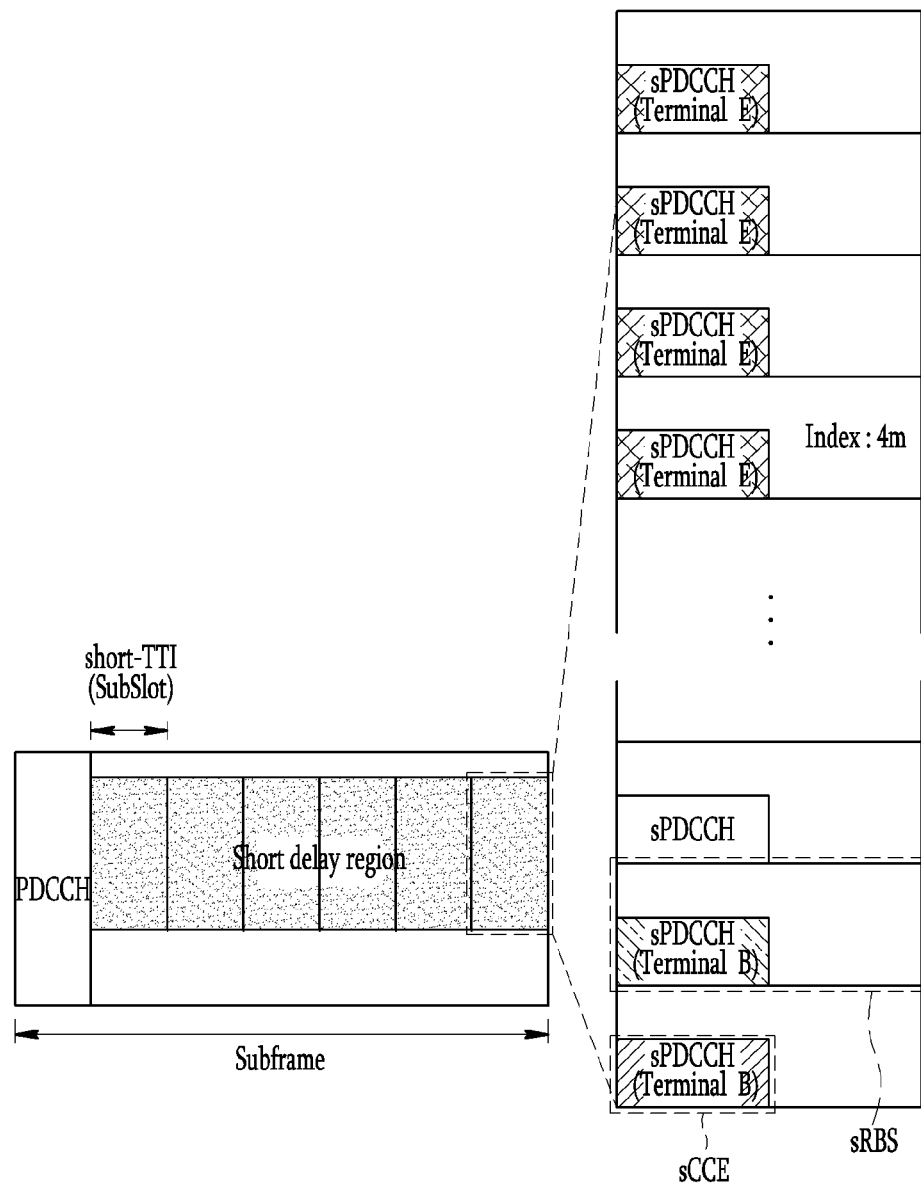
FIG. 25 is a diagram schematically illustrating an integrated control channel allocated to a short-TTI region according to an exemplary embodiment of the present invention.

FIG. 25 is a diagram schematically illustrating an integrated control channel allocated to a short-TTI region according to an exemplary embodiment of the present invention.

Referring to FIG. 25, each sRBS includes one control channel (sPDCCH) and one data channel (sPDSCH). Each control channel corresponds to the data channel included in the same sRBS. Therefore, the terminal may receive the data channel in the rest region of the sRBS in which the control channel matching the terminal is included, and therefore the control channel may not include the resource allocation information for the downlink scheduling. Further, the control channel and the data channel toward the same terminal are included in one sRBS, and thus a receiving node of the data region and a receiving node of the control region are the same, such that the DMRS for the control channel is not required.

Alternatively, each control channel may also correspond to the data channel included in other sRBSs For example, the terminal decoding the control channel may receive the data channel included in the sRBS including the decoded control channel. In some cases, the terminal may simultaneously receive the data channel included in the sRBS including the decoded control channel and the data channel included in other sRBSs.

According to the exemplary embodiment of the present invention, the sPDCCH is configured in unit a short control channel element (sCCE) and each sCCE includes $N_{sREG}^{sCCE}$ sREGs. Further, the sREG includes $N_{RE}^{sREG}$ REs. The sPDCCH may include 1, 2, 4, and 8 sCCEs according to an aggregation level. Referring to FIG. 25, one control channel includes N sCCEs and one data channel is allocated to the rest region in which the sCCE is excluded from the sRBS. The sPDCCHs corresponding to terminal A and terminal B each include one sCCE and the sPDCCH corresponding to terminal E includes four sCCEs. The number N of sCCEs may be determined according to the size of the short-TTI region, whether the sPCFICH channel is present in the short-TTI region, or the like.

Figure 26:
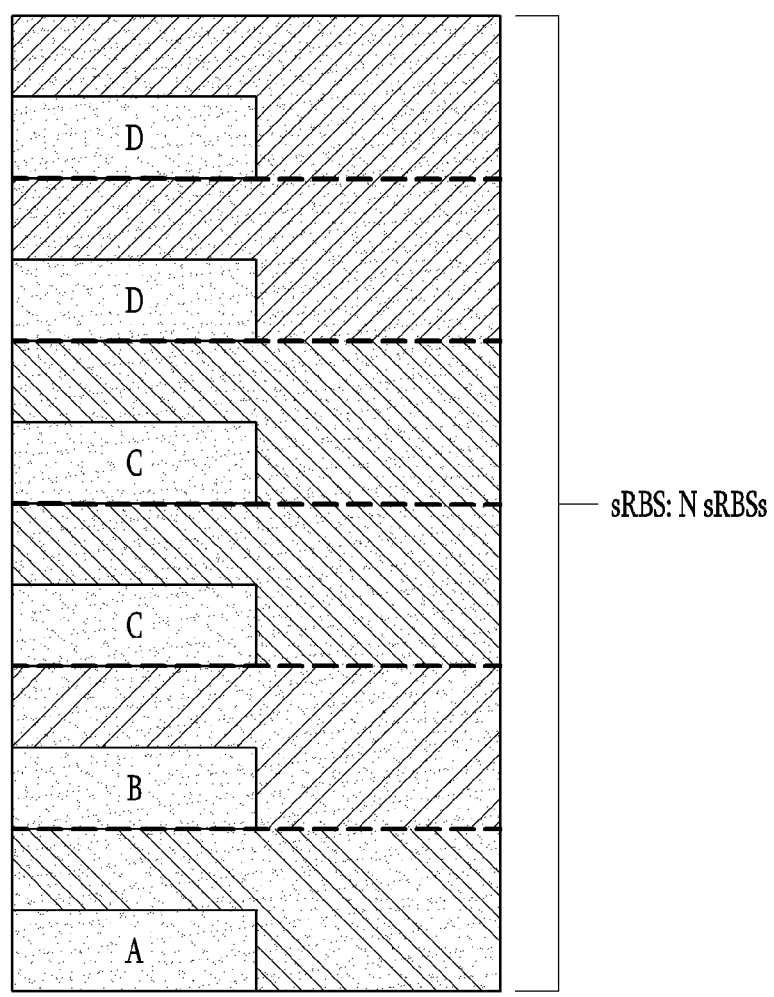
FIG. 26 is a diagram schematically illustrating a method for operating an integrated control channel allocated to a short-TTI region according to an exemplary embodiment of the present invention.

FIG. 26 is a diagram schematically illustrating a method for operating an integrated control channel allocated to a short-TTI region according to an exemplary embodiment of the present invention.

According to the exemplary embodiment of the present invention, each terminal decodes (e.g., blind decoding) the control channel configured in unit of a sCCE to determine whether the reception of the sPDCCH succeeds. That is, each terminal decodes the control channels included in each sRBS of the short-TTI region to determine what control channel the terminal matches. In this case, the allocation position (that is, start position of the sCCE included in the sPDCCH for one terminal) of the sPDCCH may be determined according to the aggregation level of the sPDCCH. For example, if the aggregation level is 1, the sCCE included in any sRBS may be allocated to the sPDCCH. However, if the aggregation level is 2, two sCCEs corresponding to one sPDCCH are continued from the sRBS of which the index is even and thus are included in two sRBSs. If the aggregation level is 4, four sCCEs corresponding to one sPDCCH are continued from the sRBS of which the index is a multiple of 4 and thus are included in four sRBSs. If the aggregation level is 8, eight sCCEs corresponding to one sPDCCH are continued from the sRBS of which the index is a multiple of 8 and thus are included in eight sRBSs. Referring to FIG. 25, the sRBS index of the start position of four sCCEs corresponding to the sPDCCH allocated to the terminal E is 4 m (m is an integer of 0 or more). That is, if the aggregation level of the sPDCCH is a, the index of the sRBS corresponding to the start position of a sCCEs included in the sPDCCH is a multiple of a.

Referring to FIG. 26, one subslot of the short-TTI region includes six sRBSs and the six sRBSs (first sRBS, second sRBS, . . . , sixth sRBS sequentially from below) each correspond to four terminals A, B, C, and D. That is, the control channel and the data channel may be transmitted to four terminals through the six sRBSs. The control channel and the data channel may be transmitted to the terminal A through the first sRBS, the control channel and the data channel may be transmitted to the terminal B through the second sRBS, the control channel and the data channel may be transmitted to the terminal C through the third and fourth sRBSs, and the control channel and the data channel may be transmitted to the terminal D through the fifth and sixth sRBSs. The terminal A receiving the subslot of the short-TTI region performs the blind decoding on the control channel included in each sRBS to confirm whether the control channel of the first sRBS matches the terminal A and receive the data channel at the first sRBS. The sPDCCH aggregation levels of the terminal A and the terminal B are 1 and the sPDCCH aggregation levels of the terminal C and the terminal D are 2.

Figure 27:
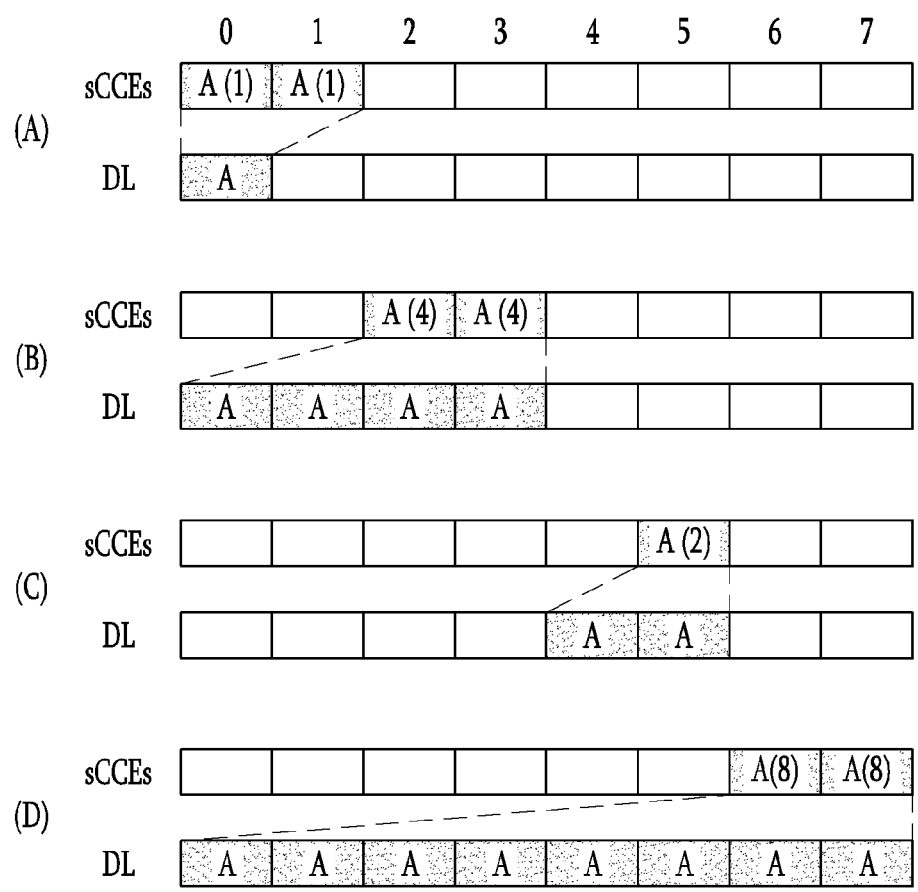
FIGS. 27 (A) to (D) and 28 are diagrams schematically illustrating a method for allocating a resource using a resource expansion field according to an exemplary embodiment of the present invention.

FIGS. 27 (A) to (D) and 28 are diagrams schematically illustrating a method for allocating a resource using a resource expansion field according to an exemplary embodiment of the present invention.

To perform the uplink scheduling through the integrated control channel according to the exemplary embodiment of the present invention, the sDCI of the control channels included in each sRBS may include a resource expansion field. The following Table 6 shows the resource expansion field according to the exemplary embodiment of the present invention.

TABLE 6

| Field | length | Description |
| --- | --- | --- |
| Resource expansion | 2 bits | 00-11: resource expansion 1, 2 and 4, 8 |

Referring to FIG. 6, values 00, 01, 10, and 11 of the resource expansion field indicate the size of the data channel mapped by the control channel. At this point, the size of the data channel may be represented by the number of sRBSs and the allocation position (i.e., start position of the sRBS corresponding to the sPDSCH for one terminal) of the sPDSCH may be determined based on the index of the start sCCE of the control channel. That is, the index of the sRBS corresponding to the sPDSCH is determined like the method for determining a start position of sCCE of a control channel allocated at the same aggregation level as the indicated level through the resource expansion field (i.e., start at the same index as the sCCE of the control channel that has the same aggregation level as the indicated size through the resource expansion field) and includes the start index of the sCCE of the control channel allocating the SPDSCH.

In FIG. 27(A), '1' is indicated by the resource expansion field of the sPDCCH of which the aggregation level is 2, and therefore the sPDSCH (data region) consisting of one sRBS (#0 sRBS) may be allocated to the terminal A through the sPDCCH consisting of two sCCEs of the control region. At this point, the index of the sRBS corresponding to the sPDSCH starts at the index where the control channel of the aggregation level 1 is located and is determined to include #0 that is the first index of the sCCE included in the control channel. In FIG. 27(B), '4' is indicated by the resource expansion field of the sPDCCH of which the aggregation level is 2, and therefore the four data regions (data region included in #0 to #3 sRBSs) may be allocated to the terminal A through the sPDCCH consisting of two sCCEs of the control region. In this case, the index of the sRBS corresponding to the sPDSCH is equal to the sCCE of the control channel of which the aggregation level is 4 and is determined to include #2 that is the start index of the sCCE of the control channel. Further, the data region included in four sRBSs is allocated through #2 and #3 sCCEs, and therefore the control region of the sRBS including #0 and #1 data regions may be used as the uplink control channel. The features that the control channel that is not used for the downlink resource allocation is used for the uplink resource allocation will be described in detail with reference to FIG. 28.

In FIG. 27(C), '2' is indicated by the resource expansion field of the sPDCCH of which the aggregation level is 1, and therefore two data regions (data region included in #5 and #6 sRBS) may be allocated to the terminal A through one sCCE of the control region. In this case, the index of the sRBS corresponding to the sPDSCH is equal to the sCCE of the control channel of which the aggregation level is 2 and is determined to include the first index #5 of the sCCE of the control channel. In FIG. 27(D), '8' is indicated by the resource expansion field of the sPDCCH of which the aggregation level is 2, and therefore may be allocated to the terminal A that is eight data regions (data region included in #0 to #7 sRBSs) through two sCCEs of the control region. In this case, the index of the sRBS corresponding to the sPDSCH is equal to the sCCE of the control channel of which the aggregation level is 8 and is determined to include the first index #6 of the sCCE of the control channel.

Meanwhile, using the resource expansion field according to the exemplary embodiment of the present invention, among the control region included in the sRBSs of one downlink data transmission region, the region not used for the allocation of the downlink data channel may be used to allocate the uplink data channel. That is, the terminal may acquire the uplink control information in the control channel that is not used to allocate the downlink data channel. At this point, the uplink control information also includes the resource expansion field and therefore the plurality of data regions may be indicated to the terminal.

Figure 28:
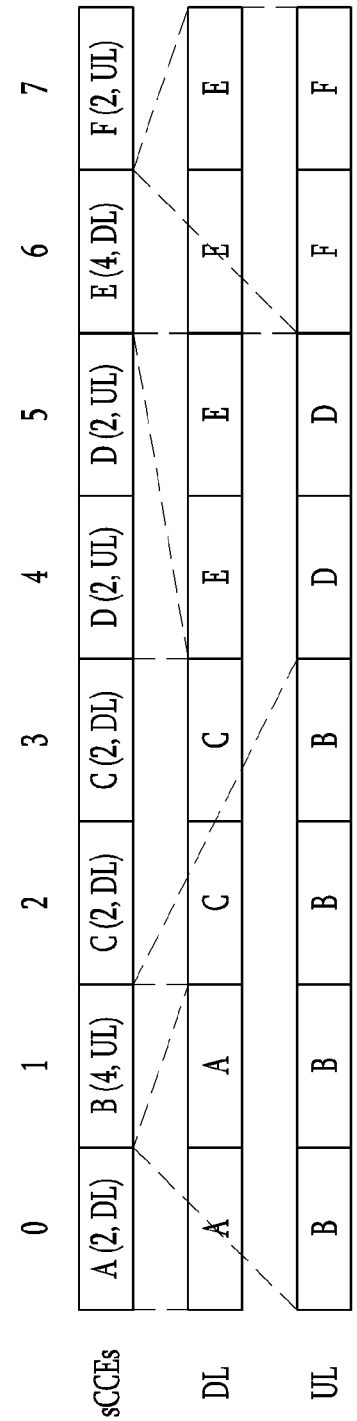

Referring to FIG. 28, if #0 and #1 data regions are allocated to the terminal A through #0 sCCE, the uplink data channel may be allocated to the terminal B using #1 sCCE. The two downlink data regions are allocated to the terminal C through #2 and #3 sCCEs and the two uplink data regions are allocated to the terminal D through #4 and #5 sCCEs.

Figure 29:
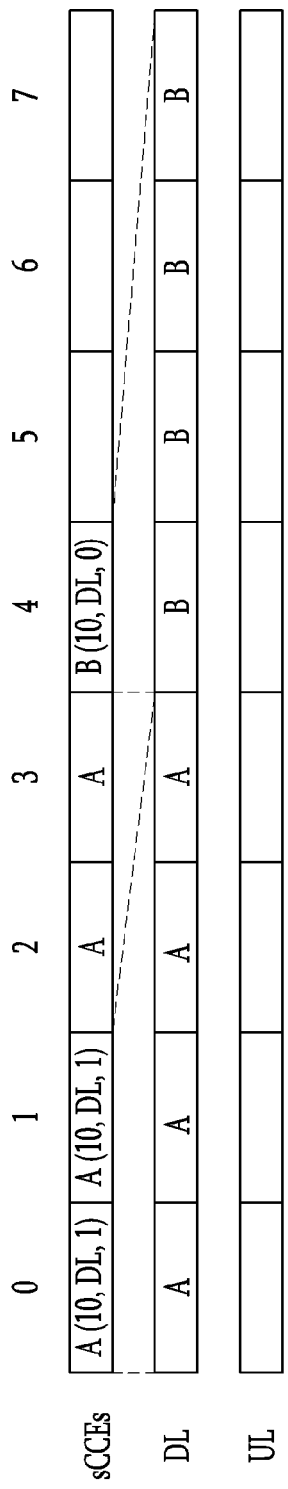
FIG. 29 is a diagram schematically illustrating a method for allocating a resource using a control resource reuse field according to an exemplary embodiment of the present invention.

FIG. 29 is a diagram schematically illustrating a method for allocating a resource using a control resource reuse field according to an exemplary embodiment of the present invention.

According to the exemplary embodiment of the present invention, if the amount of resource allocation information transmitted through the control channel is not much, that is, the data region included in the plurality of sRBSs is allocated through the small amount of resource allocation information, the sRBS in which the control channel is not used may be generated. In this case, the sDCI may include a control resource reuse (CRR) field to allow the non-used control channel to be used for the data transmission. The following Table 7 shows the control resource reuse field.

TABLE 7

| Field | length | Description |
| --- | --- | --- |
| Control Resource Reuse | 1 bit | 0: RE for control channel is not reused<br>1: RE for control channel is reused for mapping of data channel |

The control resource reuse field according to the exemplary embodiment of the present invention may be applied at the time of the downlink resource allocation and may be applied when the size of the data channel allocated through the resource expansion field is larger than the size (i.e., the number of sCCEs) of the control channel.

Referring to FIG. 29, four downlink data regions are allocated to the terminal A through #0 and #1 sCCEs and a CRR field is 1, and therefore #2 and #3 sCCEs of the control region are also reused for the data channel. However, even when the four downlink data regions are allocated to the terminal B through #4 sCCE, the CRR field is 0, and therefore the control region of #5 to #7 sCCEs is not reused for the data channel.

As described above, the downlink and uplink data transmission having a short delay time may be made using the sTTI in a slot unit and a subslot unit. That is, in the system of the frequency division multiplexing scheme, the downlink data channel and the uplink data channel are allocated using the sTTI in a subslot unit, and thus the sTTI specific operation may be implemented. At this point, the control region and the data region are configured in a new resource allocation unit, the data resource may be allocated through the smaller size of resource allocation information. The control channel that is not used for the allocation of the downlink data resource may be used as the uplink control channel for the dynamic allocation of the uplink data resource through a newly defined field or may be reused for the downlink data and the overhead of the control channel may be minimized. Further, the control channel is dispersed in the short-TTI region, and therefore the frequency multiplexing effect may be expected.

Figure 30:
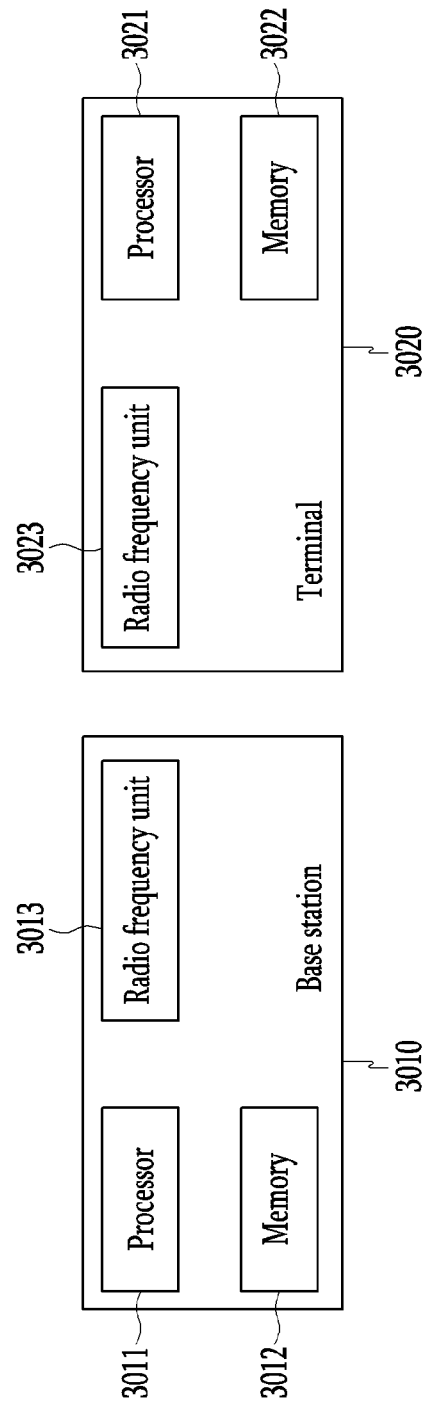
FIG. 30 is a block diagram illustrating a wireless communication system according to an exemplary embodiment of the present invention.

FIG. 30 is a block diagram illustrating a wireless communication system according to an exemplary embodiment of the present invention.

Referring to FIG. 30, a wireless communication system according to an exemplary embodiment of the present invention includes a base station 3010 and a terminal 3020.

The base station 3010 includes a processor 3011, a memory 3013, and a radio frequency unit (RF unit) 3013. The memory 3012 may be connected to the processor 3011 to store various pieces of information for driving the processor 3011 or at least one program executed by the processor 3011. The radio frequency unit 3013 may be connected to the processor 3011 to transmit/receive a wireless signal. The processor 3011 may implement functions, processes, or methods proposed by the exemplary embodiment of the present invention. In this case, in the wireless communication system according to the exemplary embodiment of the present invention, a wireless interface protocol layer may be implemented by the processor 3011. An operation of the base station 3010 according to the exemplary embodiment of the present invention may be implemented by the processor 3011.

The terminal 3020 includes a processor 3021, a memory 3022, and a radio frequency unit 3023. The memory 3022 may be connected to the processor 3021 to store various pieces of information for driving the processor 3021 or at least one program executed by the processor 3021. The radio frequency unit 3023 may be connected to the processor 3021 to transmit/receive a wireless signal. The processor 3021 may implement functions, processes, or methods proposed by the exemplary embodiment of the present invention. In this case, in the wireless communication system according to the exemplary embodiment of the present invention, a wireless interface protocol layer may be implemented by the processor 3021. An operation of the terminal 3020 according to the exemplary embodiment of the present invention may be implemented by the processor 3021.

According to the exemplary embodiment of the present invention, the memory may be positioned inside or outside the processor and the memory may be connected to the processor through already known various means. The memory is various types of volatile or non-volatile storage media. For example, the memory may include a read-only memory (ROM) or a random access memory (RAM).

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

What is claimed is:

1. A terminal of a wireless communication system, the terminal comprising:
   a processor, a memory, and a radio frequency (RF) unit, wherein the processor executes a program stored in the memory to perform:
   decoding a plurality of short control channel elements (sCCEs) included in a plurality of short resource block sets (sRBSs), wherein the plurality of sRBSs are received in unit of a short transmission time interval (sTTI) in a short delay region of a subframe by using the RF unit; and
   receiving, when a control channel is successfully decoded from a decoding result of at least one sCCE of the plurality of sCCEs, data in at least one sRBS including the at least one sCCE by using the RF unit,
   wherein each of the plurality of sRBSs includes a sCCE of the plurality of sCCEs.

2. The terminal of claim 1, wherein: the sRBS includes a smaller number of orthogonal frequency division multiplexing (OFDM) symbols than a number of OFDM symbols included in a legacy resource block.

3. The terminal of claim 1, wherein the processor executes the program to further perform:
   receiving configuration information which configures the short delay region in the subframe and a location of the sCCE in a sRBS through a higher layer or a downlink control information included in a legacy physical downlink control channel; and
   receiving the plurality of sCCEs in the plurality of sRBSs based on the configuration information.

4. The terminal of claim 3, wherein the short delay region is configured to locate in a legacy data channel of the subframe.

5. The terminal of claim 1, wherein a number of the at least one sCCE from which the control channel is successfully decoded is determined based on an aggregation level of the plurality of sCCEs.

6. The terminal of claim 1, wherein the processor executes the program to further perform:
   receiving, when the control channel is successfully decoded from a decoding result of at least one sCCE of the plurality of sCCEs and a resource expansion field included in the control channel indicates at least one adjacent sRBS, data in the at least one adjacent sRBS by using the RF unit, wherein the at least one adjacent sRBS is adjacent to the at least one sRBS.

7. The terminal of claim 1, wherein the control channel includes a resource expansion field indicating a number of the at least one sRBS where the data is received.

8. The terminal of claim 7, wherein when a bit value of the resource expansion field is 00, 01, 10, and 11, the number of the at least one sRBS is indicated by 1, 2, 4, and 8, respectively.

9. The terminal of claim 1, wherein the processor executes the program to further perform:
   determining, when the control channel is successfully decoded from a decoding result of at least one sCCE of the plurality of sCCEs, a resource expansion field and a control resource reuse (CRR) field included in the control channel, wherein the resource expansion field indicates at least one adjacent sRBS;
   receiving data in the at least one adjacent sRBS by using the RF unit; and
   receiving data in a sCCE included in the at least one adjacent sRBS by using the RF unit based on indication of the CRR field.

10. The terminal of claim 9, wherein: when performing the receiving of the data in the sCCE included in the at least one adjacent sRBS, the processor performs:
    receiving the data in the sCCE included in the at least one adjacent sRBS when the indication of the CRR field is 1; or
    receiving no data in the sCCE included in the at least one adjacent sRBS when the indication of the CRR field is 0.

11. A method for receiving, by a terminal, data in a wireless communication system, the method comprising:
    decoding a plurality of short control channel elements (sCCEs) included in a plurality of short resource block sets (sRBSs), wherein the plurality of sRBSs are received in unit of a short transmission time interval (sTTI) in a short delay region of a subframe; and
    receiving, when a control channel is successfully decoded from a decoding result of at least one sCCE of the plurality of sCCEs, data in at least one sRBS including the at least one sCCE,
    wherein each of the plurality of sRBSs includes a sCCE of the plurality of sCCEs.

12. The method of claim 11, further comprising:
    receiving configuration information which configures the short delay region in the subframe and a location of the sCCE in a sRBS through a higher layer or a downlink control information included in a legacy physical downlink control channel; and
    receiving the plurality of sCCEs in the plurality of sRBSs based on the configuration information.

13. The method of claim 11, wherein a number of the at least one sCCE from which the control channel is successfully decoded is determined based on an aggregation level of the plurality of sCCEs.

14. The method of claim 11, further comprising:
    receiving, when the control channel is successfully decoded from a decoding result of at least one sCCE of the plurality of sCCEs and a resource expansion field included in the control channel indicates at least one adjacent sRBS, data in the at least one adjacent sRBS, wherein the at least one adjacent sRBS is adjacent to the at least one sRBS.

15. The method of claim 11, wherein the control channel includes a resource expansion field indicating a number of the at least one sRBS where the data is received.

16. The method of claim 15, wherein when a bit value of the resource expansion field is 00, 01, 10, and 11, the number of the at least one sRBS is indicated by 1, 2, 4, and 8, respectively.

17. The method of claim 11, further comprising:
determining, when the control channel is successfully decoded from a decoding result of at least one sCCE of the plurality of sCCEs, a resource expansion field and a control resource reuse (CRR) field included in the control channel, wherein the resource expansion field indicates at least one adjacent sRBS;
receiving data in the at least one adjacent sRBS; and
receiving data in a sCCE included in the at least one adjacent sRBS based on indication of the CRR field.

18. The method of claim 17, wherein: the receiving of the data in the sCCE included in the at least one adjacent sRBS includes:
receiving the data in the sCCE included in the at least one adjacent sRBS when the indication of the CRR field is 1; or
receiving no data in the sCCE included in the at least one adjacent sRBS the indication of the CRR field is 0.

19. A terminal of a wireless communication system, the terminal comprising:
a processor, a memory, and a radio frequency (RF) unit,
wherein the processor executes a program stored in the memory to perform:
decoding a plurality of short control channel elements (sCCEs) included in a plurality of short resource block sets (sRBSs), wherein the plurality of sRBSs are received in unit of a short transmission time interval (sTTI) in a short delay region of a subframe by using the RF unit; and
transmitting, when an uplink control information is acquired from a control channel which is successfully decoded from at least one sCCE of the plurality of sCCEs, uplink data in at least one sRBS in a next subframe for the subframe by using the RF unit, wherein the at least one sRBS in the next subframe corresponds to the at least one sCCE in the subframe.

20. The terminal of claim 19, wherein the processor executes the program to further perform:
transmitting, when the uplink control information is acquired from the control channel and a resource expansion field included in the uplink control information indicates at least one adjacent sRBS in the next subframe, uplink data in the at least one adjacent sRBS by using the RF unit, wherein the at least one adjacent sRBS is adjacent to the at least one sRBS.

* * * * *